United States Patent
Ichikawa et al.

(10) Patent No.: US 10,200,585 B2
(45) Date of Patent: Feb. 5, 2019

(54) IMAGING DEVICE, IMAGING SYSTEM, IMAGING METHOD, AND COMPUTER-READABLE RECORDING MEDIUM FOR USE IN AN IMAGING SYSTEM INCLUDING AN EXTERNAL COMMUNICATION DEVICE

(71) Applicant: Olympus Corporation, Hachioji-shi, Tokyo (JP)

(72) Inventors: Manabu Ichikawa, Hachioji (JP); Katsuhisa Kawaguchi, Atsugi (JP); Masaomi Tomizawa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/373,737

(22) Filed: Dec. 9, 2016

(65) Prior Publication Data
US 2017/0099425 A1    Apr. 6, 2017

Related U.S. Application Data

(63) Continuation of application No. 14/751,983, filed on Jun. 26, 2015, now Pat. No. 9,554,028, which is a (Continued)

(30) Foreign Application Priority Data

Oct. 11, 2013    (JP) .................................. 2013-214219

(51) Int. Cl.
*H04N 1/21*    (2006.01)
*G06K 9/00*    (2006.01)
(Continued)

(52) U.S. Cl.
CPC ......... *H04N 5/23206* (2013.01); *G03B 15/00* (2013.01); *G03B 17/18* (2013.01);
(Continued)

(58) Field of Classification Search
CPC ............... H04N 5/23206; H04N 5/772; H04N 5/23293; H04N 5/23203; H04N 1/2125;
(Continued)

(56) References Cited

U.S. PATENT DOCUMENTS 6,774,935 B1    8/2004  Morimoto et al.
7,154,535 B2   12/2006  Yamasaki et al.
(Continued)

FOREIGN PATENT DOCUMENTS

CN    1901624      1/2007
CN    103179343    6/2013
(Continued)

OTHER PUBLICATIONS

International Search Report to International Application No. PCT/JP2014/066181, dated Sep. 2, 2014 (2 pgs.).
(Continued)

*Primary Examiner* — Albert H Cutler
(74) *Attorney, Agent, or Firm* — John C. Pokotylo; Pokotylo Patent Services

(57) ABSTRACT

An imaging device includes a first communication unit, an imaging control unit, and a recording determination unit that determines whether or not an image data is to be recorded according to an operation instruction. The first communication unit transmits recording permission information to an external communication device when a user operation is a recording permission operation, and transmits recording prohibition information to the communication device when the user operation is a recording prohibition operation. The imaging control unit associates image data with determination result determined by the recording determination unit and either one of the recording permission information and the recording prohibition information and controls a recording unit to record the image data.

15 Claims, 18 Drawing Sheets

Related U.S. Application Data continuation of application No. PCT/JP2014/066181, filed on Jun. 18, 2014.

(51) Int. Cl.

| | | |
|---|---|---|
| *H04N 1/00* | (2006.01) | |
| *G06F 17/30* | (2006.01) | |
| *H04N 5/232* | (2006.01) | |
| *G03B 15/00* | (2006.01) | |
| *G03B 17/18* | (2006.01) | |
| *H04N 5/765* | (2006.01) | |
| *H04N 5/77* | (2006.01) | |

(52) U.S. Cl.
CPC ..... *H04N 5/23203* (2013.01); *H04N 5/23293* (2013.01); *H04N 5/765* (2013.01); *H04N 5/772* (2013.01)

(58) Field of Classification Search
CPC .............. H04N 1/212; H04N 1/00244; H04N 2201/0084; G03B 17/18; G03B 15/00; G06K 9/00671; G06F 17/30817
See application file for complete search history.

(56) References Cited

U.S. PATENT DOCUMENTS

| 8,306,393 | B2 | 11/2012 | Yamasaki et al. |
| 8,964,050 | B2 | 2/2015 | Koide |
| 2007/0002144 | A1 | 1/2007 | Tsuchida et al. |
| 2009/0021591 | A1 | 1/2009 | Sako |
| 2009/0033748 | A1 | 2/2009 | Ejima et al. |
| 2012/0086820 | A1 | 4/2012 | Kurosawa et al. |
| 2012/0092515 | A1* | 4/2012 | Yim .................. G06F 17/30247 348/222.1 |
| 2013/0182138 | A1 | 7/2013 | Cho |
| 2013/0201351 | A1 | 8/2013 | Matsuda |

FOREIGN PATENT DOCUMENTS

| JP | 11-284945 | 10/1999 |
| JP | 2004-312626 | 11/2004 |
| JP | 2005-057343 | 3/2005 |
| JP | 2006-014119 | 1/2006 |
| JP | 2006-270263 | 10/2006 |
| JP | 2009-200836 | 9/2009 |
| JP | 2010-045852 | 2/2010 |
| JP | 2011-066768 | 3/2011 |
| JP | 2011-211391 | 10/2011 |
| JP | 2012-109852 | 6/2012 |
| JP | 2013-047940 | 7/2013 |

OTHER PUBLICATIONS

Written Opinion to International Application No. PCT/JP2014/066181 dated Sep. 2, 2014 (4 pgs.).
Notice of Rejection issued in the corresponding Japanese Application No. 2015-510526 dated Apr. 7, 2015 (1 pg.) with translation (2 pgs.).
Chinese Office Action to Chinese Patent Application No. 201480004759.5, dated Feb. 3, 2016 (7 pgs.).
Japanese Office Action to Japanese Patent Application No. 2015-128106, dated Jun. 7, 2016 (2 pgs.) with translation (3 pgs.).
Japanese Decision of Patent Grant to corresponding Japanese Patent Application No. 2015-128106, dated Nov. 1, 2016, (1 pg.), with translation (2 pgs.).

* cited by examiner

VIEW OF LOCATION WHERE USER OF
IMAGING DEVICE IS PRESENT

IMAGING DEVICE, IMAGING SYSTEM, IMAGING METHOD, AND COMPUTER-READABLE RECORDING MEDIUM FOR USE IN AN IMAGING SYSTEM INCLUDING AN EXTERNAL COMMUNICATION DEVICE

CROSS REFERENCES TO RELATED APPLICATIONS

This application is a continuation of U.S. patent application Ser. No. 14/751,983 (referred to as "the '983 application" and incorporated herein by reference), filed on Jun. 26, 2015, titled "IMAGING DEVICE, IMAGING SYSTEM, IMAGING METHOD, AND COMPUTER-READABLE RECORDING MEDIUM ASSOCIATING IMAGE DATA WITH RESPONSIBILITY ACCEPTANCE OR ABANDONMENT INFORMATION," and listing Manabu ICHIKAWA, Katsuhisa KAWAGUCHI, Masaomi TOMIZAWA and Osamu NONAKA as the inventors, the '983 application being a continuation of PCT international application Ser. No. PCT/JP2014/066181 filed on Jun. 18, 2014 which designates the United States, incorporated herein by reference, and which claims the benefit of priority from Japanese Patent Application No. 2013-214219, filed on Oct. 11, 2013, incorporated herein by reference.

BACKGROUND

1. Technical Field

The present invention relates to an imaging device for imaging a subject, an imaging system including the imaging device, an imaging method to be performed by the imaging device, and a computer-readable recording medium.

2. Related Art

In recent years, there is known a technique of causing an imaging device such as a digital camera or a digital video camera to display, on a display unit, a live view image corresponding to image date generated by imaging, and to sequentially transmit the image data to an external communication device such as a mobile phone by using communication technology (see Japanese Patent Application Laid-open No. 2006-14119).

The technique is a technique for a user of a communication device to issue an operation instruction (a shooting instruction for performing still image shooting, a field-of-view change instruction for changing the field of view, and the like) to a user of an imaging device by using communication technology.

Specifically, according to the technique, the communication device sequentially receives pieces of image data transmitted from the imaging device, and sequentially displays live view images corresponding to the pieces of image data on the display unit. The user of the communication device checks the live view image displayed on the display unit of the communication device, and performs a predetermined operation on the communication device in the case of causing the imaging device to perform still image shooting or of changing the field of view for imaging at the imaging device, for example. An operation instruction is transmitted from the communication device to the imaging device by the operation mentioned above, and the imaging device displays information according to the operation instruction on the display unit after receiving the operation instruction. Then, the user of the imaging device checks the information displayed on the display unit of the imaging device, and determines whether or not to perform an operation according to the operation instruction.

SUMMARY

In accordance with some embodiments, an imaging device, an imaging system, an imaging method, and a computer-readable recording medium are presented.

In some embodiments, an imaging device includes: an imaging unit that images a subject to generate image data; a first communication unit that receives operation instruction information related to an operation instruction from an external communication device; a user operation recognition unit that recognizes a user operation; an imaging control unit that controls a recording unit to record the image data; and a recording determination unit that determines, based on at least one of the operation instruction information and the user operation, whether or not the image data is to be recorded according to the operation instruction. The first communication unit transmits recording permission information to the communication device when the user operation recognition unit recognizes that the user operation is a recording permission operation, and transmits recording prohibition information to the communication device when the user operation recognition unit recognizes that the user operation is a recording prohibition operation, the recording permission operation being an operation for permitting recording the image data in the recording unit, the recording prohibition operation being an operation for prohibiting recording the image data in the recording unit, the recording permission information indicating permission of recording the image data in the recording unit, and the recording prohibition information indicating prohibition of recording the image data in the recording unit. The imaging control unit associates the image data with determination result information related to a result determined by the recording determination unit and either one of the recording permission information and the recording prohibition information and controls the recording unit to record the image data.

In some embodiments, an imaging device includes: an imaging unit that images a subject to generate image data; a first communication unit that receives operation instruction information related to an operation instruction from an external communication device; a user operation recognition unit that recognizes a user operation; and an imaging control unit that controls a recording unit to record the image data. The first communication unit transmits recording permission information to the communication device when the user operation recognition unit recognizes that the user operation is a recording permission operation, and transmits recording prohibition information to the communication device when the user operation recognition unit recognizes that the user operation is a recording prohibition operation, the recording permission operation being an operation for permitting recording the image data in the recording unit, the recording prohibition operation being an operation for prohibiting recording the image data in the recording unit, the permission information indicating permission of recording the image data in the recording unit, and the recording prohibition information indicating prohibition of recording the image data in the recording unit. The imaging control unit associates the image data with at least one of the operation instruction information received by the first communication unit and user operation information related to the user operation recognized by the user operation recognition unit and either one of the recording permission information and the recording prohibition information and controls the recording unit to record the image data.

In some embodiments, an imaging system includes; the imaging device; and a communication device that connects to the imaging device to transmit and receive information to and from the imaging device. The communication device includes: an instruction accepting unit that accepts an operation instruction for the imaging device; and a second communication unit that transmits operation instruction information related to the operation instruction to the imaging device.

In some embodiments, an imaging method executed by an imaging device is presented. The imaging method includes: capturing a subject to generate image data; recognizing a user operation; controlling a recording unit to record the image data; determining, based on at least one of operation instruction information received from an external communication device and the user operation, whether or not the image data is to be recorded according to the operation instruction; and transmitting recording permission information to the communication device when the user operation is a recording permission operation, and transmitting recording prohibition information to the communication device when the user operation is a recording prohibition operation, the recording permission operation being an operation for permitting recording the image data in the recording unit, the recording prohibition operation being an operation for prohibiting recording the image data in the recording unit, the recording permission information indicating permission of recording the image data in the recording unit, and the recording prohibition information indicating prohibition of recording the image data in the recording unit. In the controlling, the image data is associated with determination result information related to a result determined in the determining and either one of the recording permission information and the recording prohibition information and is recorded in the recording unit.

In some embodiments, an imaging method executed by an imaging device is presented. The imaging method includes: capturing a subject to generate image data; recognizing a user operation; controlling a recording unit to record the image data; and transmitting recording permission information to an external communication device when the user operation is a recording permission operation, and transmitting recording prohibition information to the communication device when the user operation is a recording prohibition operation, the recording permission operation being an operation for permitting recording the image data in the recording unit, the recording prohibition operation being an operation for prohibiting recording the image data in the recording unit, the recording permission information indicating permission of recording the image data in the recording unit, and the recording prohibition information indicating prohibition of recording the image data in the recording unit. In the controlling, the image data is associated with at least one of operation instruction information received from the communication device and user operation information related to the user operation and either one of the recording permission information and the recording prohibition information and is recorded in the recording unit.

In some embodiments, a non-transitory computer readable recording medium having an executable program recorded thereon is presented. The program instructs a processor included in an imaging device, to execute: capturing a subject to generate image data; recognizing a user operation; controlling a recording unit to record the image data; determining, based on at least one of operation instruction information received from an external communication device and the user operation, whether or not the image data is to be recorded according to the operation instruction; and transmitting recording permission information to the communication device when the user operation is a recording permission operation, and transmitting recording prohibition information to the communication device when the user operation is a recording prohibition operation, the recording permission operation being an operation for permitting recording the image data in the recording unit, the recording prohibition operation being an operation for prohibiting recording the image data in the recording unit, the recording permission information indicating permission of recording the image data in the recording unit, and the recording prohibition information indicating prohibition of recording the image data in the recording unit. In the controlling, the image data is associated with determination result information related to a result determined in the determining and either one of the recording permission information and the recording prohibition information and is recorded in the recording unit.

In some embodiments, a non-transitory computer readable recording medium having an executable program recorded thereon is presented. The program instructs a processor included in an imaging device, to execute: capturing a subject to generate image data; recognizing a user operation; controlling a recording unit to record the image data; and transmitting recording permission information to an external communication device when the user operation is a recording permission operation, and transmitting recording prohibition information to the communication device when the user operation is a recording prohibition operation, the recording permission operation being an operation for permitting recording the image data in the recording unit, the recording prohibition operation being an operation for prohibiting recording the image data in the recording unit, the recording permission information indicating permission of recording the image data in the recording unit, and the recording prohibition information indicating prohibition of recording the image data in the recording unit. In the controlling, the image data is associated with at least one of operation instruction information received from the communication device and user operation information related to the user operation and either one of the recording permission information and the recording prohibition information and is recorded in the recording unit.

The above and other features, advantages and technical and industrial significance of this invention will be better understood by reading the following detailed description of presently preferred embodiments of the invention, when considered in connection with the accompanying drawings.

DETAILED DESCRIPTION

Figure 1:
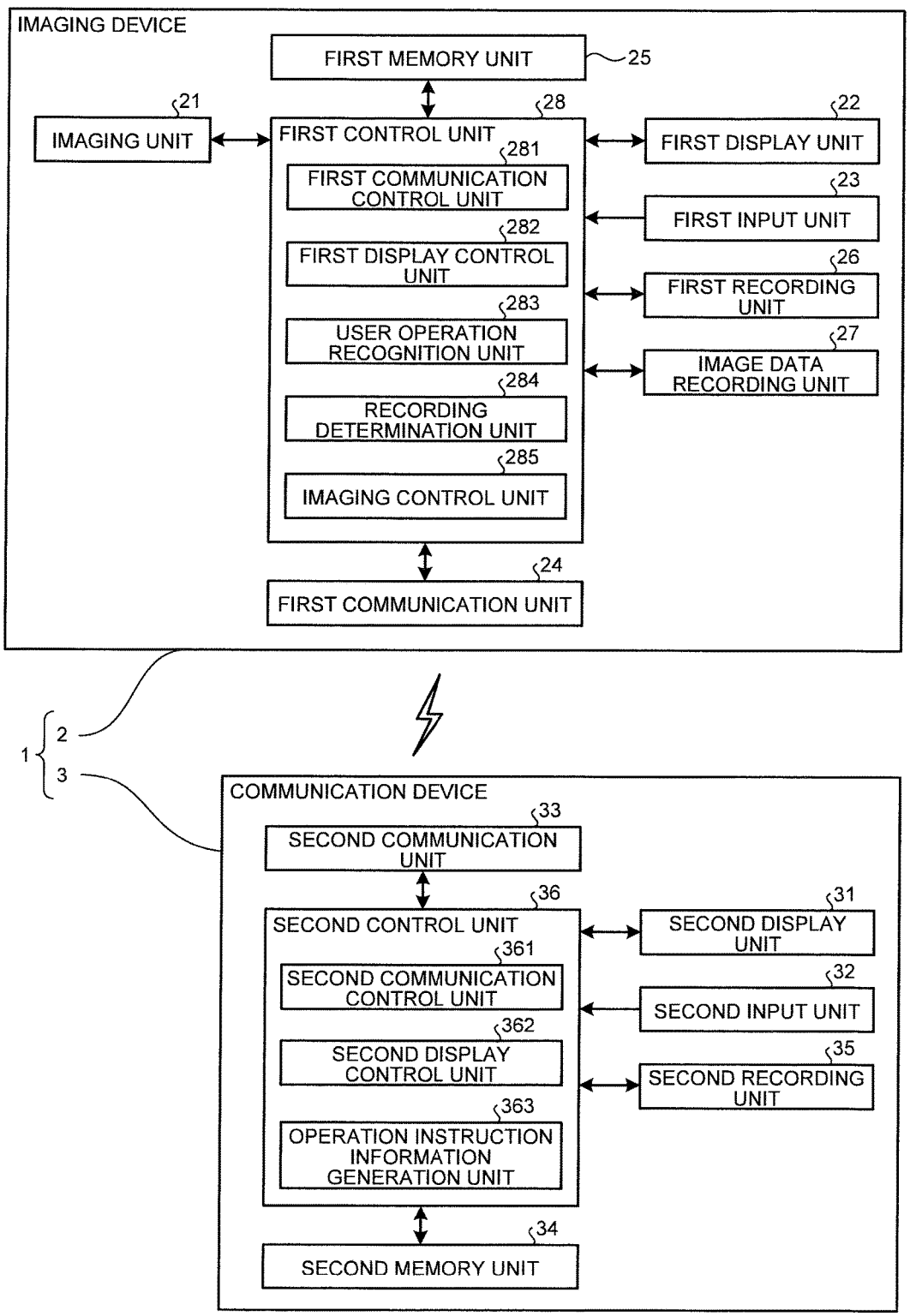
FIG. 1 is a block diagram illustrating a configuration of an imaging system according to a first embodiment of the present invention.

Hereinafter, modes of carrying out the present invention (hereinafter referred to as "embodiment(s)") will be described with reference to the drawings. Additionally, the present invention is not to be limited by the embodiments described below. Moreover, in the drawings, the same portions are denoted by the same reference signs.

First Embodiment

Schematic Configuration of Imaging System>

FIG. 1 is a block diagram illustrating a configuration of an imaging system 1 according to a first embodiment of the present invention.

The imaging system 1 includes an imaging device 2 (FIG. 1) and a communication device 3 (FIG. 1) that are operated by different users, and that are connected in a manner capable of exchanging information with each other by wireless communication.

Additionally, the imaging system 1 may be configured to connect the imaging device 2 and the communication device 3 in a manner capable of exchanging information by wired communication, without being limited to wireless communication.

Moreover, the imaging system 1 is a system according to which, when the user of the communication device 3 inputs an operation instruction to the communication device 3, the imaging device 2 which is at a location away from the user of the communication device 3 is caused to automatically operate, or the user of the imaging device 2 is caused to recognize the operation instruction via the imaging device 2, and is urged to operate the imaging device 2 according to the operation instruction.

That is, in the first embodiment, the operation instruction that is issued by the user of the communication device 3 includes both the operation instruction for the imaging device 2 and the operation instruction for the user of the imaging device 2.

Configuration of Imaging Device

The imaging device 2 is a device for imaging an object, and is configured as an electronic device such as a digital camera, a digital video camera, a mobile phone with a shooting function or a tablet mobile appliance, an endoscope, or a microscope, for example.

Additionally, in the following, the main portions of the present invention will be mainly described as the structural elements of the imaging device 2.

As illustrated in FIG. 1, the imaging device 2 includes an imaging unit 21, a first display unit 22, a first input unit 23, a first communication unit 24, a first memory unit 25, a first recording unit 26, an image data recording unit 27, a first control unit 28, and the like.

The imaging unit 21 images an object and generates image data under the control of the first control unit 28. This imaging unit 21 is configured by an image sensor such as a CCD (Charge Coupled Device) for converting received light into an electrical signal, a signal processing unit for generating digital image data by performing signal processing (A/D conversion or the like) on the electrical signal (an analog signal) from the image sensor, and the like.

Then, the image data generated by the imaging unit 21 is, under the control of the first control unit 28, sequentially stored in the first memory unit 25 and recorded in the image data recording unit 27 according to an automatic shooting instruction from outside or a shooting operation on the first input unit 23 by the user of the imaging device 2.

The automatic shooting instruction here is an operation instruction for the imaging device 2, and is an operation instruction for causing the imaging device 2 to automatically perform a shooting operation with no reference to the intention of the user of the imaging device 2.

The first display unit 22 is configured by using a display panel such as a liquid crystal panel or an organic EL (Electro Luminescence) panel.

For example, the first display unit 22 sequentially displays (live-view displays), under the control of the first control unit 28, live view images corresponding to pieces of image data (hereinafter referred to as "live view image data") that are successively generated by the imaging unit 21 and that are sequentially stored in the first memory unit 25. Also, the first display unit 22 displays, under the control of the first control unit 28, an image corresponding to an image file recorded in the image data recording unit 27. Furthermore, the first display unit 22 displays, under the control of the first control unit 28, an image obtained by superimposing an image according to operation instruction information received by the first communication unit 24 on a live view image.

The first input unit 23 is configured by using buttons, switches and the like for receiving user operations, and outputs an instruction signal according to a user operation to the first control unit 28.

The first communication unit 24 performs, under the control of the first control unit 28, wireless communication, with the communication device 3, of various types of data including live view image data and signals necessary for communication, according to a predetermined protocol.

The first memory unit 25 stores image data generated by the imaging unit 21, operation instruction information received from the communication device 3 via the first communication unit 24, user operation information regarding a user operation recognized at the first control unit 28, and the like.

The first recording unit 26 records various programs to be executed by the first control unit 28 (including an imaging program), various types of data that are used during execution of the programs, and the like.

The image data recording unit 27 has a function as a recording unit according to the present invention, and records, under the control of the first control unit 28, image data generated by the imaging unit 21 and an image file which is the image data with which determination result information described later is associated.

The first control unit 28 is configured by using a CPU (Central Processing Unit) and the like, and controls the operation of the imaging device 2 in an overall manner by, for example, issuing an instruction or performing transfer of data to a corresponding unit configuring the imaging device 2 according to an instruction signal from the first input unit 23, operation instruction information received by the first communication unit 24, or the like.

As illustrated in FIG. 1, the first control unit 28 includes a first communication control unit 281, a first display control unit 282, a user operation recognition unit 283, a recording determination unit 284, an imaging control unit 285, and the like.

The first communication control unit 281 controls the operation of the first communication unit 24, and causes the same to perform wireless communication with the communication device 3.

For example, the first communication control unit 281 causes pieces of live view image data successively generated by the imaging unit 21 and sequentially stored in the first memory unit 25 to be sequentially transmitted to the communication device 3 via the first communication unit 24.

The first display control unit 282 controls the operation of the first display unit 22, and causes the first display unit 22 to display an image.

For example, the first display control unit 282 reads live view image data stored in the first memory unit 25, and causes the first display unit 22 to perform live view display. Also, the first display control unit 282 reads an image file stored in the image data recording unit 27, and causes the first display unit 22 to display an image corresponding to the image file. Moreover, the first display control unit 282 superimposes, on a live view image, an image according to operation instruction information received by the first communication unit 24, and causes the first display unit 22 to display the superimposed image.

The user operation recognition unit 283 recognizes an operation on the imaging device 2 by a user of the imaging device 2 (a user operation). Then, user operation information regarding the user operation recognized by the user operation recognition unit 283 is stored in the first memory unit 25.

The recording determination unit 284 determines, at the time of recording of image data in the image data recording unit 27 based on at least one of the operation instruction information and the user operation information stored in the first memory unit 25, whether or not the image data is to be recorded according to an operation instruction from the outside (an operation instruction based on the operation instruction information).

Specifically, the recording determination unit 284 performs the determination mentioned above based only on the operation instruction information in the case where the operation instruction based on the operation instruction information is the automatic shooting instruction.

Also, the recording determination unit 284 performs the determination mentioned above based on both the operation instruction information and the user operation information in the case where the operation instruction based on the operation instruction information is an operation instruction other than the automatic shooting instruction (for example, a shooting reservation instruction).

The shooting reservation instruction here is an operation instruction for the user of the imaging device 2, and is an operation instruction for performing a shooting operation after an operation other than the shooting operation has been performed.

Furthermore, the recording determination unit 284 performs the determination mentioned above based only on the user operation information in the case where the first communication unit 24 does not receive the operation instruction information.

Then, the recording determination unit 284 generates determination result information regarding the result of determination mentioned above.

The imaging control unit 285 generates an image file according to an instruction signal from the first input unit 23

(a shooting operation by the user of the imaging device 2 on the first input unit 23) or the operation instruction information received by the first communication unit 24 (the automatic shooting instruction), and records the image file in the image data recording unit 27.

The image file here is a file in which the determination result information generated by the recording determination unit 284 is associated with the image data generated by the imaging unit 21.

Configuration of Communication Device

The communication device 3 is an device for performing wireless communication with the imaging device 2, and is configured as a digital camera, a digital video camera, a mobile phone or a tablet mobile appliance, for example.

Additionally, in the following, the main portions of the present invention will be mainly described as the structural elements of the communication device 3.

As illustrated in FIG. 1, the communication device 3 includes a second display unit 31, a second input unit 32, a second communication unit 33, a second memory unit 34, a second recording unit 35, a second control unit 36, and the like.

The second display unit 31 is configured by using a display panel such as a liquid crystal panel or an organic EL panel, and displays an image under the control of the second control unit 36.

The second input unit 32 is configured by using buttons, switches, a touch panel, a microphone, and the like.

That is, the second input unit (button, switch, touch panel) 32 receives a user operation by the user of the communication device 3, and outputs an instruction signal according to the user operation to the second control unit 36. Also, the second input unit (microphone or the like) 32 generates audio data by inputting, and converting into an electrical signal, a word (speech) uttered by the user of the communication device 3 and by performing, by applying sampling and quantization, A/D conversion on the electrical signal which has been converted, and outputs the audio data to the second control unit 36.

Moreover, the second input unit 32 has a function as an instruction accepting unit according to the present invention.

The second communication unit 33 performs, under the control of the second control unit 36, wireless communication, with the imaging device 2, of various types of data including live view image data and signals necessary for communication, according to a predetermined protocol.

The second memory unit 34 stores live view image data transmitted from the imaging device 2 and received via the second communication unit 33, for example.

The second recording unit 35 records various programs to be executed by the second control unit 36, various types of data that are used during execution of the programs, and the like.

The second control unit 36 is configured by using a CPU and the like, and controls the operation of the communication device 3 in an overall manner by, for example, issuing an instruction or performing transfer of data to a corresponding unit configuring the communication device 3 according to an instruction signal, audio data or the like from the second input unit 32.

A second communication control unit 361 controls the operation of the second communication unit 33, and causes the same to perform wireless communication with the imaging device 2.

For example, the second communication control unit 361 causes operation instruction information generated by an operation instruction information generation unit 363 to be transmitted to the imaging device 2 via the second communication unit 33.

A second display control unit 362 causes the second display unit 31 to display a predetermined image (for example, a live view image corresponding to the live view image data received by the second communication unit 33).

The operation instruction information generation unit 363 generates operation instruction information regarding an operation instruction for the imaging device 2 or the user of the imaging device 2, based on an instruction signal or audio data from the second input unit 32.

Operation of Imaging System

Next, the operation of the imaging system 1 described above will be described.

In the following, as the operation of the imaging system 1, the operation of the imaging device 2 (an imaging method according to the present invention), and the operation of the communication device 3 will be described in this order.

Operation of Imaging Device

Figure 2:
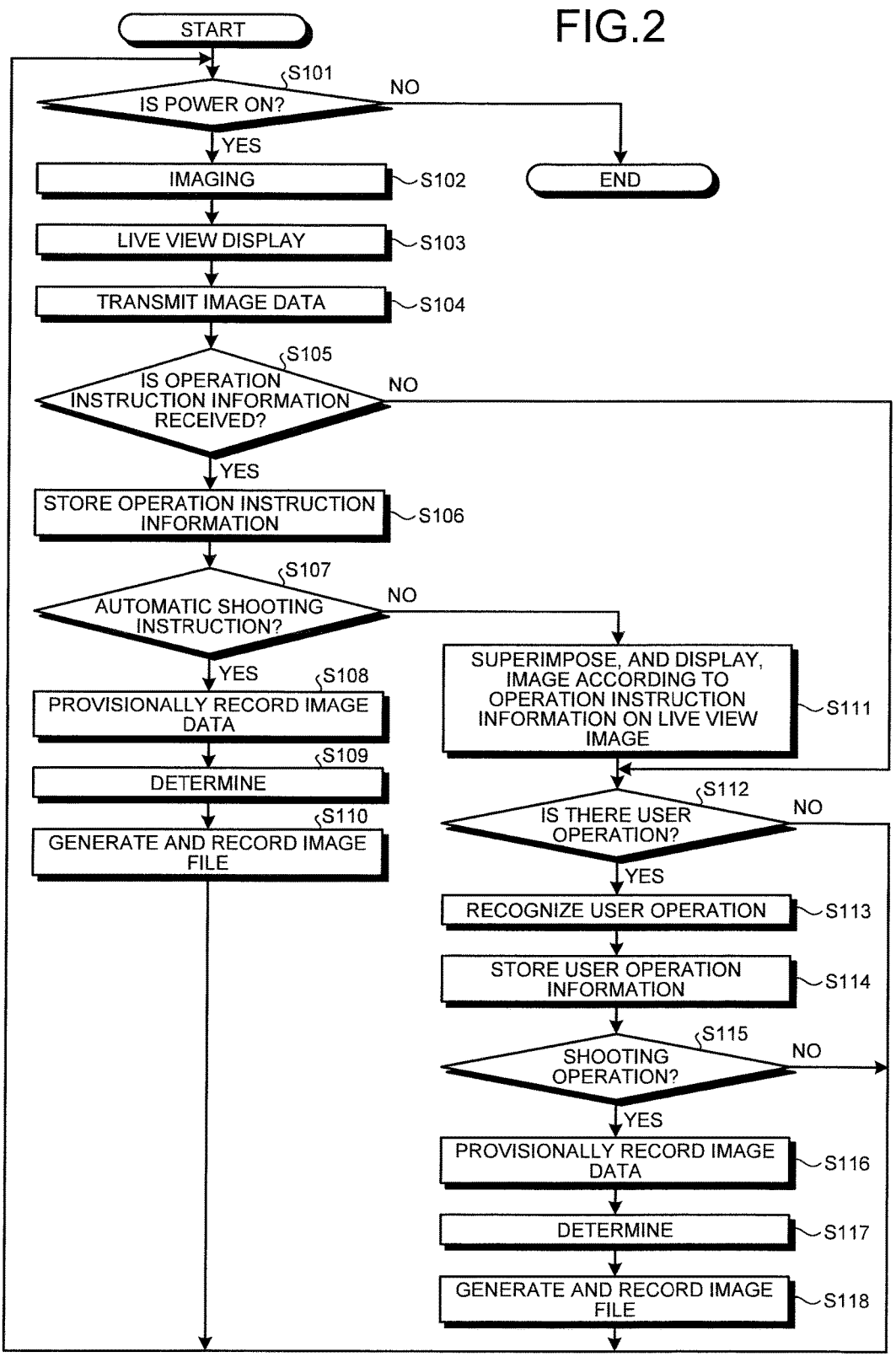
FIG. 2 is a flow chart illustrating an operation of an imaging device illustrated in FIG. 1.

FIG. 2 is a flow chart illustrating the operation of the imaging device 2.

When the power of the imaging device 2 is turned on by an operation by the user of the imaging device 2 on the first input unit 23 (step S101: Yes), the first control unit 28 causes the imaging unit 21 to start imaging (step S102: imaging step). Then, the image data generated by the imaging unit 21 is sequentially stored in the first memory unit 25.

Next, the first display control unit 282 causes the first display unit 22 to start live view display (step S103).

Also, the first communication control unit 281 causes the latest live view image data that is stored in the first memory unit 25 (the same image data as that of the live view image that is displayed by the first display unit 22 in step S103) to be sequentially transmitted to the communication device 3 via the first communication unit 24 (step S104).

Additionally, for the sake of convenience of description, in FIG. 2, step S104 is illustrated to be performed after step S103, but in reality, steps S103 and S104 are performed approximately at the same time.

Now, in remote camera shooting using the imaging system 1 according to the first embodiment, to make clear where the responsibility regarding the copyright or the personality rights arising at the time of shooting, or regarding shooting in a shooting prohibited area, for example, lies is a matter of great importance that must be considered. To prevent troubles regarding the responsibilities as described above, position information such as GPS (Global Positioning System) information indicating the use state of the imaging device 2 or information about the attitude, such as height or inclination, of the imaging device 2 based on atmospheric pressure or inclination determination may be transmitted in step S104 together with the live view image data, or the user of the imaging device 2 (the holder or owner of the imaging device 2) may perform an operation on the imaging device 2 (corresponding to a recording permission operation or a recording prohibition operation according to the present invention) to thereby transmit a signal indicating external shooting prohibition or permission (corresponding to recording prohibition information or recording permission information according to the present invention) in step S104 together with the live view image data. In the case where such a signal (the signal indicating external shooting prohibition or permission, for example) is transmitted, external shooting prohibition information indicating external shooting prohibition (corresponding to the recording prohibition information according to the present invention) or external shooting permission information indicating external shooting permission (corresponding to the recording permission information according to the present invention) may be recorded in step S110 or S118 described later, in association with the image data. Furthermore, the user of the imaging device 2 may operate the imaging device 2 (a responsibility acceptance operation or a responsibility abandonment operation according to the present invention) to thereby cause first responsibility acceptance information indicating that the user of the imaging device 2 accepts the responsibility of shooting (recording of image data) by the imaging device 2 or first responsibility abandonment information indicating abandonment of the responsibility by the user of the imaging device 2 to be transmitted in step S104 together with the live view image data. In the case where such first responsibility acceptance information or first responsibility abandonment information is transmitted, the first responsibility acceptance information or the first responsibility abandonment information may be recorded in step S110 or S118 described later, in association with the image data. Additionally, with respect to the information to be transmitted in step S104, information regarding various settings of the imaging device 2, such as shooting parameters, may of course be transmitted.

Subsequently, the first communication control unit 281 determines whether or not operation instruction information has been received from the communication device 3 via the first communication unit 24 (step S105).

If it is determined that operation instruction information is not received (step S105: No), the imaging device 2 proceeds to step S112.

On the other hand, if it is determined that operation instruction information is received (step S105: Yes), the first control unit 28 stores the operation instruction information in the first memory unit 25 (step S106).

Then, the imaging control unit 285 determines whether or not the operation instruction that is based on the operation instruction information received by the first communication unit 24 is the automatic shooting instruction (step S107).

If the automatic shooting instruction is determined (step S107: Yes), the imaging control unit 285 provisionally records, in the first memory unit 25, as image data that is planned to be recorded in the image data recording unit 27 (hereinafter referred to as "recording planned image data"), the latest live view image data that is stored in the first memory unit 25 (image data corresponding to the live view image that is displayed on the first display unit 22 at this time) (step S108).

Next, the recording determination unit 284 determines, based on the operation instruction information stored in the first memory unit 25 (the automatic shooting instruction), whether or not the recording planned image data is to be recorded according to an operation instruction from outside, and generates determination result information regarding the result of the determination (step S109: determination step).

Here, in the case where the operation instruction based on the operation instruction information is the automatic shooting instruction, the recording determination unit 284 generates determination result information indicating shooting according to an external request.

Next, the imaging control unit 285 reads the recording planned image data which was provisionally recorded in the first memory unit 25 in step S108, and generates an image file in which the determination result information generated in step S109 is associated with the recording planned image data. Then, the imaging control unit 285 records the image file in the image data recording unit 27 (step S110: recording step). Then, the imaging device 2 returns to step S101.

Referring back to step S107, if other than the automatic shooting instruction is determined (step S107: No), the first display control unit 282 superimposes, on the live view image corresponding to the latest live view image data that is stored in the first memory unit 25 (the live view image that is currently displayed on the first display unit 22), an image according to the operation instruction information which was stored in the first memory unit 25 in step S106, and causes the first display unit 22 to display the superimposed image for a predetermined period of time (step S111).

After step S111, or in the case where it is determined that operation instruction information is not received (step S105: No), the user operation recognition unit 283 determines whether or not there is an operation (a user operation) on the imaging device 2 by the user of the imaging device 2 (step S112).

The user operation here includes an operation on the first input unit 23, and an operation of moving the imaging device 2 itself.

Then, the user operation recognition unit 283 determines an operation on the first input unit 23 based on an instruction signal from the first input unit 23. Also, the user operation recognition unit 283 determines an operation of moving the imaging device 2 itself by comparing pieces of live view image data that are stored in the first memory unit 25 and that are temporally continuous, and by recognizing a change in the position of each object image included in each piece of the live view image data.

Additionally, an accelerometer or the like for detection the motion of the imaging device 2 may be separately provided to the imaging device 2, and an operation of moving the imaging device 2 itself may be recognized based on a detection signal from the accelerometer.

Also, as the user operation, the operation indicating the external shooting permission described above (corresponding to the recording permission operation according to the present invention), the operation indicating the external shooting prohibition (corresponding to the recording prohibition operation according to the present invention), and the like may be included. Furthermore, as the user operation, the responsibility acceptance operation indicating that the user of the imaging device 2 accepts the responsibility for the shooting, the responsibility abandonment operation indicating that the user of the imaging device 2 abandons the responsibility, and the like may be included.

In the case where it is determined that there is no user operation (step S112: No), the imaging device 2 returns to step S101.

On the other hand, in the case where it is determined that there is a user operation (step S112: Yes), the user operation recognition unit 283 recognizes the content of the user operation (step S113: user operation recognition step), and stores user operation information regarding the user operation in the first memory unit 25 (step S114).

Next, the user operation recognition unit 283 determines whether or not the content of the user operation recognized in step S113 is a shooting operation (step S115).

If other than a shooting operation is determined (step S115: No), the imaging device 2 returns to step S101.

On the other hand, in the case where a shooting operation is determined (step S115: Yes), the imaging control unit 285 provisionally records, in the first memory unit 25, as the recording planned image data, the latest live view image data that is stored in the first memory unit 25 (step S116).

Next, the recording determination unit 284 determines, based on at least one of the operation instruction information and the user operation information stored in the first memory unit 25, whether or not the recording planned image data is to be recorded according to an operation instruction from outside, and generates determination result information regarding the result of the determination (step S117: determination step).

Subsequently, the imaging control unit 285 reads the recording planned image data which was provisionally stored in the first memory unit 25 in step S116, and generates an image file in which the determination result information generated in step S117 is associated with the recording planned image data. Then, the imaging control unit 285 records the image file in the image data recording unit 27 (step S118: recording step). Then, the imaging device 2 returns to step S101.

Operation of Communication Device>

Figure 3:
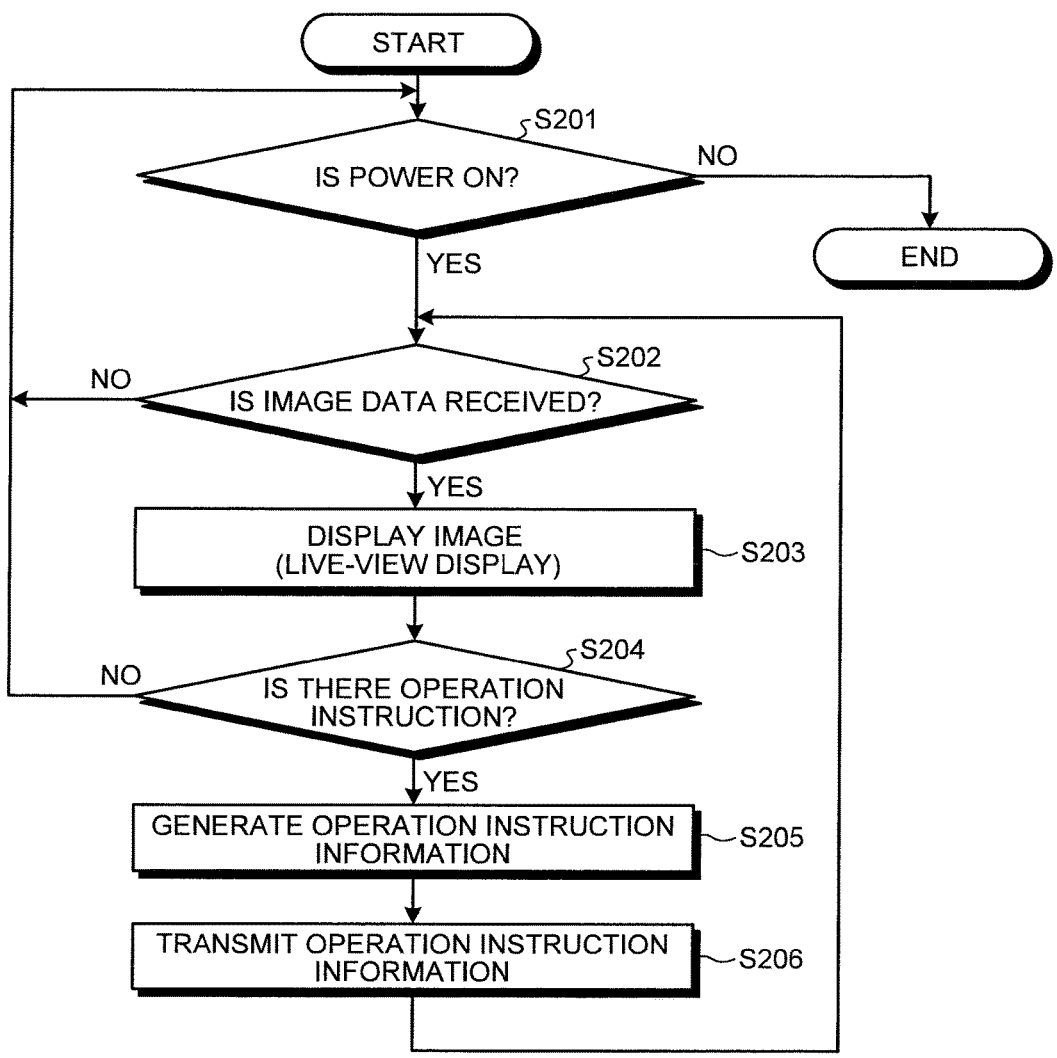
FIG. 3 is a flow chart illustrating an operation of a communication device illustrated in FIG. 1.

FIG. 3 is a flow chart illustrating the operation of the communication device 3.

When the power of the communication device 3 is turned on by an operation by the user of the communication device 3 on the second input unit 32 (step S201: Yes), the second communication control unit 361 determines whether or not live view image data has been received from the imaging device 2 via the second communication unit 33 (step S202).

If it is determined that live view image data is not received (step S202: No), the communication device 3 returns to step S201.

On the other hand, if it is determined that live view image data is received (step S202: Yes), the second control unit 36 causes the second memory unit 34 to sequentially store received live view image data. Then, the second display control unit 362 sequentially reads the live view image data stored in the second memory unit 34, and causes the second display unit 31 to display (live-view display) a live view image corresponding to the live view image data (step S203).

Here, if the user of the communication device 3 performs shooting by the imaging device 2 (issues an automatic shooting instruction or the like) without being aware of a shooting prohibited area, this may cause troubles. Accordingly, information of whether or not shooting by the imaging device 2 is allowed may be displayed on the live view image that is displayed in step S203 based on information transmitted from the imaging device 2 (position information such as GPS information or the like, information about the attitude (an unnatural low angle), such as height or inclination, of the imaging device 2, a signal indicating external shooting prohibition, or the like), for example.

Then, the operation instruction information generation unit 363 determines whether or not there is an operation instruction for the imaging device 2 for the user of the imaging device 2, based on an instruction signal or audio data from the second input unit 32 (step S204).

If it is determined that there is no operation instruction (step S204: No), the communication device 3 returns to step S201.

On the other hand, if it is determined that there is an operation instruction (step S204: Yes), the operation instruction information generation unit 363 generates operation instruction information regarding the operation instruction, based on the instruction signal or the audio data from the second input unit 32 (step S205).

Here, as the operation instruction, change of a shooting parameter, an instruction regarding panning, angle or attitude, and the like may be included. Also, an instruction for cancellation of various settings is also possible. Furthermore, the operation instruction information may also include second responsibility abandonment information indicating that the user of the communication device 3 will not be involved in the later shooting, and second responsibility acceptance information indicating that the user of the communication device 3 accepts shooting by the imaging device 2. If the user of the imaging device 2 and the user of the communication device 3 abandon the responsibility, the imaging device 2 may assume that shooting is not possible. Also, a mode is also possible where shooting is enabled only when both users accept the responsibility.

Next, the second communication control unit 361 causes the operation instruction information generated in step S205 to be transmitted to the imaging device 2 via the second communication unit 33 (step S206). Then, the communication device 3 returns to step S202.

Here, in the case where the operation instruction information including the second responsibility acceptance information or the second responsibility abandonment information is transmitted to the imaging device 2, the imaging device 2 may display, together with the live view image, an image according to the second responsibility acceptance information or the second responsibility abandonment information which has been received (an image indicating that the user of the communication device 3 has accepted the responsibility for shooting or an image indicating abandonment of the responsibility). Furthermore, the imaging device 2 may record, in step S110 or S118, the second responsibility acceptance information or the second responsibility abandonment information which has been received, in association with the image data.

Specific Examples of Operation Instruction and Image File

Specific examples of the operation instruction to be issued by the user of the communication device 3 and the image file to be generated by the imaging device 2 at the time of operation of the imaging system 1 as described above will be described.

In the following, a case where the operation instruction is "automatic shooting instruction", a case where the operation instruction is "shooting reservation instruction", and a case of "shooting as intended by the user of the imaging device 2 with no reference to an operation instruction" will be described in this order.

Automatic Shooting Instruction>

Figure 4:
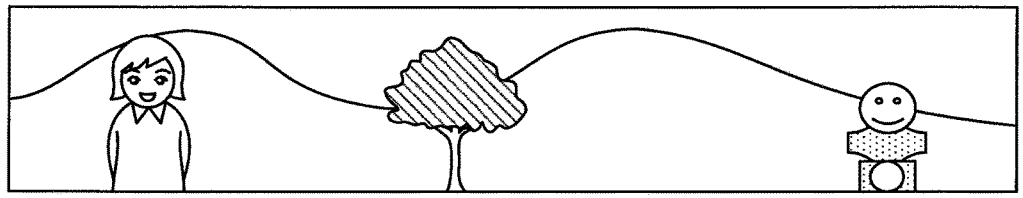
FIG. 4 is a diagram for describing an operation instruction that is issued by a user of the communication device at the time of operation of the imaging system illustrated in FIGS. 2 and 3.
Figure 5:
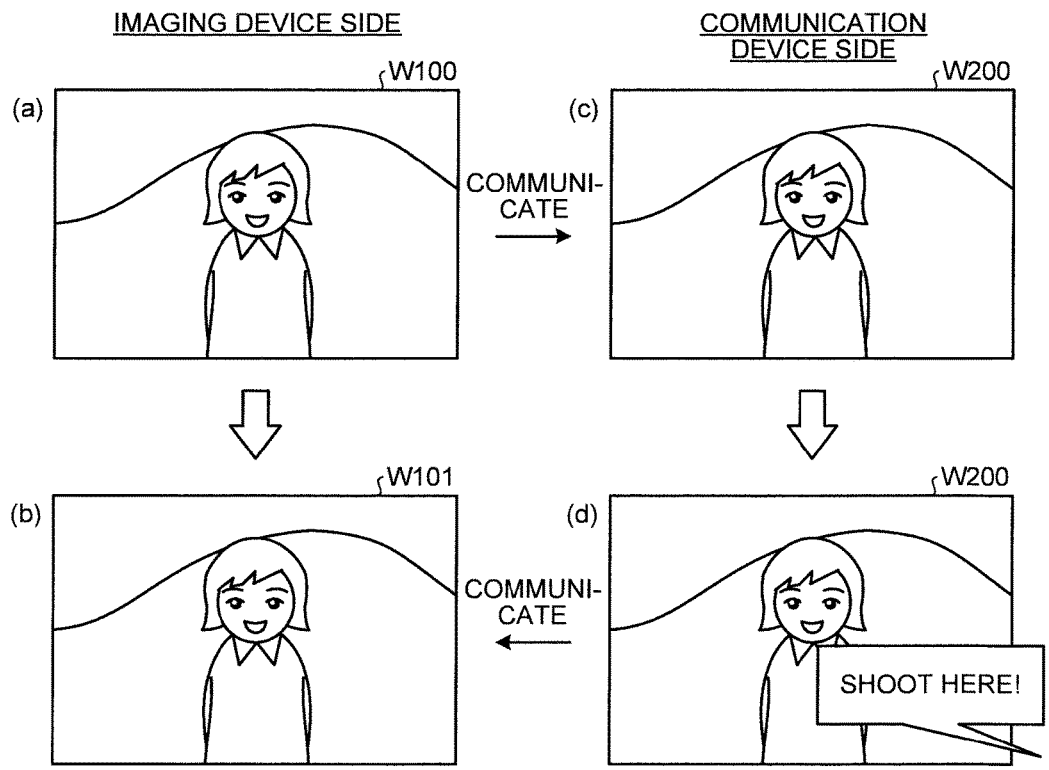
FIG. 5 is a diagram illustrating an example of an automatic shooting instruction (an operation instruction) that is issued by a user of the communication device at the time of operation of the imaging system illustrated in FIGS. 2 and 3.

FIG. 4 is a diagram for describing an operation instruction that is issued by the user of the communication device 3 at the time of operation of the imaging system 1. FIG. 5 is a diagram illustrating an example of an automatic shooting instruction (an operation instruction) that is issued by the user of the communication device 3 at the time of operation of the imaging system 1.

Specifically, FIG. 4 is a diagram illustrating a view of the location where the user of the imaging device 2 is present. (a) and (b) of FIG. 5 are diagrams illustrating examples of images to be displayed by the imaging device 2. (c) and (d) of FIG. 5 are diagrams illustrating examples of images to be displayed by the communication device 3.

For example, with respect to the live view display at the imaging device 2 (step S103), a live view image W100 illustrated in (a) of FIG. 5 is given as the live view image that is currently displayed.

In this case, as described above, the imaging device 2 transmits live view image data corresponding to the live view image W100 that is currently displayed in step S104 to the communication device 3 while performing live view display (step S103). Then, the communication device 3 sequentially displays live view images corresponding to received pieces of live view image data (step S203). Accordingly, as illustrated in (c) of FIG. 5, a live view image W200 that is displayed by the communication device 3 is an image that is substantially the same as the live view image W100 ((a) of FIG. 5) that is displayed by the imaging device 2.

Here, if the user of the communication device 3 wants shooting to be instantaneously performed by the imaging device 2 at the time of checking the live view image W200 ((c) of FIG. 5) that is displayed by the communication device 3, the user utters the words "shoot here" as illustrated in (d) of FIG. 5, for example.

Then, the communication device 3 determines that there is an operation instruction, based on the audio data from the second input unit 32 (audio data corresponding to the audio "shoot here!") (step S204: Yes). Also, the communication device 3 analyzes the audio data, generates operation instruction information regarding the automatic shooting instruction (step S205), and transmits the same to the imaging device 2 (step S206).

On the other hand, the imaging device 2 determines that the operation instruction is the automatic shooting information, based on the operation instruction information which has been received (step S107: Yes). Then, the imaging device 2 performs provisional recording of live view image data corresponding to a live view image W101 ((b) of FIG. 5) that is displayed at the time of reception of the operation instruction information (step S108), determination (step S109), and generation and recording of an image file (step S110).

Figure 6:
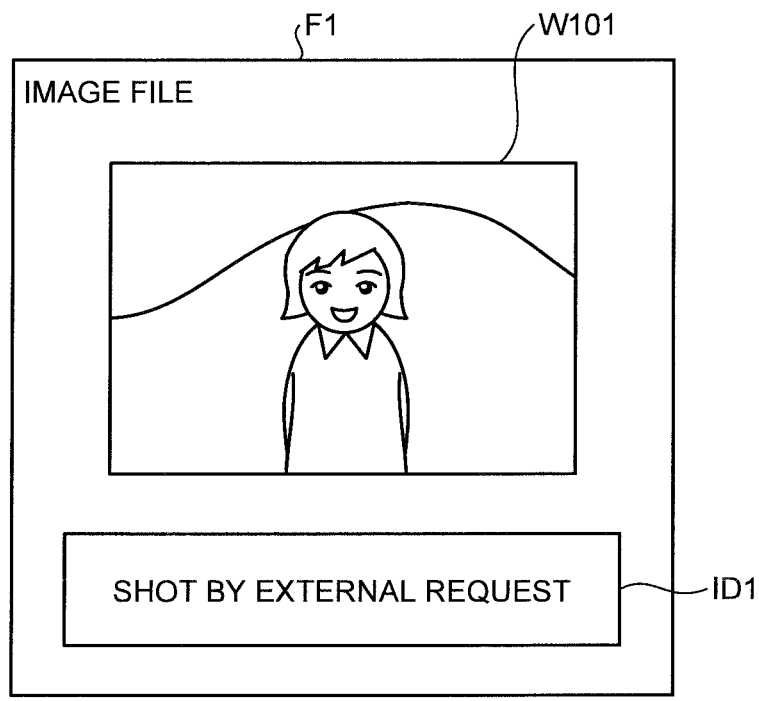
FIG. 6 is a diagram illustrating an example of an image file that is generated by the imaging device according to the automatic shooting instruction illustrated in (d) of FIG. 5.

FIG. 6 is a diagram illustrating an example of an image file F1 that is generated by the imaging device 2 according to the automatic shooting instruction illustrated in (d) of FIG. 5.

Specifically, in step S109, since the operation instruction based on the operation instruction information is the automatic shooting instruction, the imaging device 2 generates determination result information ID1 (FIG. 6) indicating shooting by an external request (shooting by the automatic shooting instruction). Then, in step S110, the imaging device 2 generates and records an image file F1 in which the determination result information ID1 is associated with the live view image data corresponding to the live view image W101, as illustrated in FIG. 6.

Shooting Reservation Instruction

Figure 7:
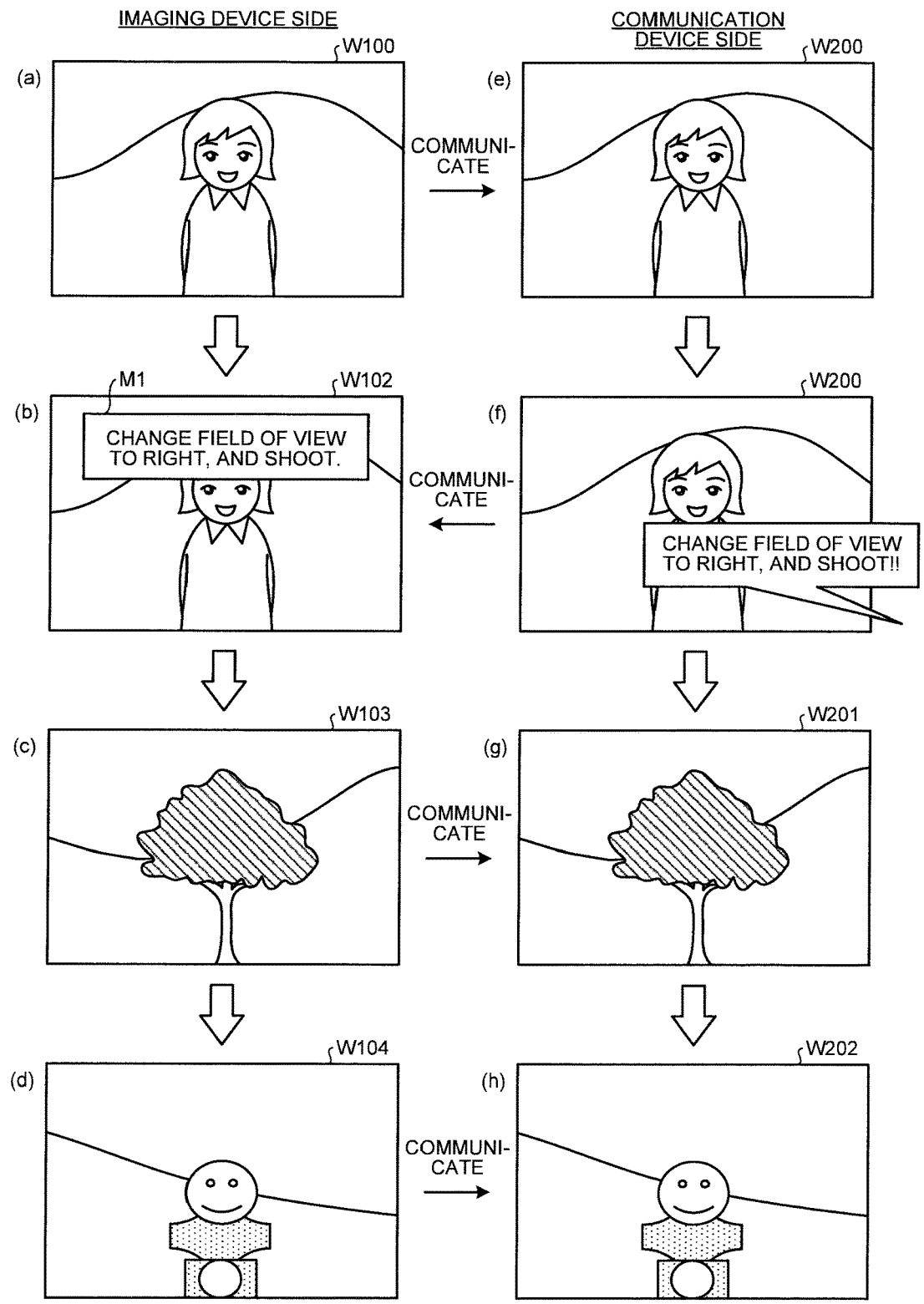
FIG. 7 is a diagram illustrating an example of a shooting reservation instruction (an operation instruction) that is issued by a user of the communication device at the time of operation of the imaging system illustrated in FIGS. 2 and 3.

FIG. 7 is a diagram illustrating an example of a shooting reservation instruction (an operation instruction) that is issued by the user of the communication device 3 at the time of operation of the imaging system 1.

Specifically, FIG. 7 is a diagram corresponding to FIGS. 4 and 5, and illustrates examples of images to be displayed by the imaging device 2 ((a) to (d) of FIG. 7), and examples of images to be displayed by the communication device 3 ((e) to (h) of FIG. 7). Additionally, (a) and (e) of FIG. 7 illustrate live view images W100 and W200 the same as those of (a) and (c) of FIG. 5, respectively.

If the user of the communication device 3 wants to change the field of view to be imaged by the imaging device 2 at the time of checking the live view image W200 ((e) of FIG. 7) that is displayed by the communication device 3, and to perform shooting with the field of view after change, the user of the communication device 3 utters words "change field of view to right, and shoot" as illustrated in (f) of FIG. 7, for example.

Then, the communication device 3 determines that there is an operation instruction, based on the audio data from the second input unit 32 (audio data corresponding to the audio "change field of view to right, and shoot") (step S204: Yes). Also, the communication device 3 analyzes the audio data, generates operation instruction information regarding a shooting reservation instruction indicating shooting after changing the field of view to the right (step S205), and transmits the same to the imaging device 2 (step S206).

On the other hand, the imaging device 2 determines, based on the operation instruction information which has been received, that the operation instruction is the shooting reservation instruction (that it is not the automatic shooting instruction) (step S107: No). Then, as illustrated in (b) of FIG. 7, the imaging device 2 superimposes, on the live view image W100 that is currently displayed, an image according to the shooting reservation instruction (a message M1: "change field of view to right, and shoot"), and displays a superimposed image W102 for a predetermined period of time (step S111).

The user of the imaging device 2 checks the message M1 included in the image W102 ((b) of FIG. 7) displayed on the imaging device 2, and determines whether or not to perform an operation according to the message M1.

In the following, a case where the user of the imaging device 2 performs an operation according to the message M1 (a case where the user moves the direction of the imaging device 2 to the right, and performs a shooting operation on the first input unit 23) will be described.

Whenever the direction of the imaging device 2 is being moved to the right by the user of the imaging device 2, the imaging device 2 determines that there is a user operation (the movement mentioned above) (step S112: Yes). Then, the imaging device 2 performs live view display (display of live view images W103 and W104 when the field of view has been changed to the right) as illustrated in (c) and (d) of FIG. 7 (step S103) while performing recognition and storage (steps S113, S114) of the content of the user operation (the movement mentioned above) until a shooting operation on the first input unit 23 is performed by the user of the imaging device 2. Additionally, live view images W201 and W202 corresponding to the live view images W103 and W104, respectively, are displayed by the communication device 3, as illustrated in (g) and (h) of FIG. 7.

In the case where a shooting operation is performed by the user of the imaging device 2 on the first input unit 23 when the live view image W104 illustrated in (d) of FIG. 7 is being displayed by the imaging device 2 (step S115: Yes), the imaging device 2 provisionally records live view image data corresponding to the live view image W104 (step S116). Also, the imaging device 2 generates determination result information indicating shooting by an external request, based on the operation instruction information which was stored in the first memory unit 25 in step S105 (the shooting reservation instruction for performing shooting after changing the field of view to the right) and the user operation information which was stored in the first memory unit 25 in step S114 (an operation for changing the field of view to the right, and the shooting operation) (step S117). Then, the imaging device 2 performs generation and recording of an image file (step S118).

Figure 8:
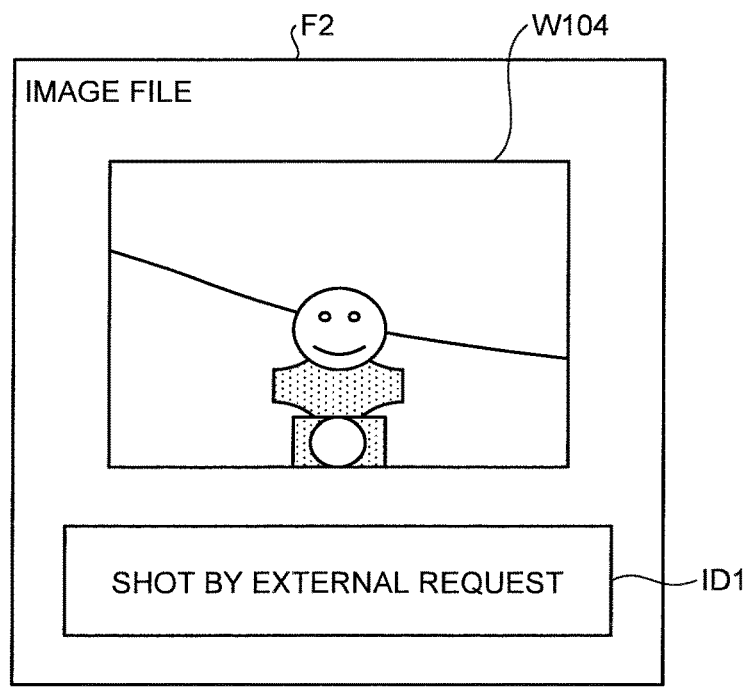
FIG. 8 is a diagram illustrating an example of an image file that is generated by the imaging device according the shooting reservation instruction illustrated in (f) of FIG. 7.

FIG. 8 is a diagram illustrating an example of an image file F2 that is generated by the imaging device 2 according the shooting reservation instruction illustrated in (f) of FIG. 7.

Specifically, in step S118, the imaging device 2 generates and records an image file F2 in which the determination result information ID1 indicating shooting by an external request is associated with the live view image data corresponding to the live view image W104, as illustrated in FIG. 8.

Additionally, although not specifically illustrated, if the user of the imaging device 2 does not perform an operation according to the message M1 (for example, if the direction of the imaging device 2 is moved to the left, and a shooting operation is performed on the first input unit 23), the imaging device 2 performs the following process.

That is, in step S117, the imaging device 2 generates determination result information indicating shooting by the user of the imaging device 2 based on the operation instruction information which was stored in the first memory unit 25 in step S105 (the shooting reservation instruction for performing shooting after changing the field of view to the right) and the user operation information which was stored in the first memory unit 25 in step S114 (the operation of changing the field of view to the left, and the shooting operation). Then, in step S118, the imaging device 2 generates and records an image file in which the determination result information indicating shooting by the user of the imaging device 2 (for example, determination result information ID2 illustrated in FIG. 9) is associated with the live view image data that is displayed at the time of the shooting operation.

Figure 9:
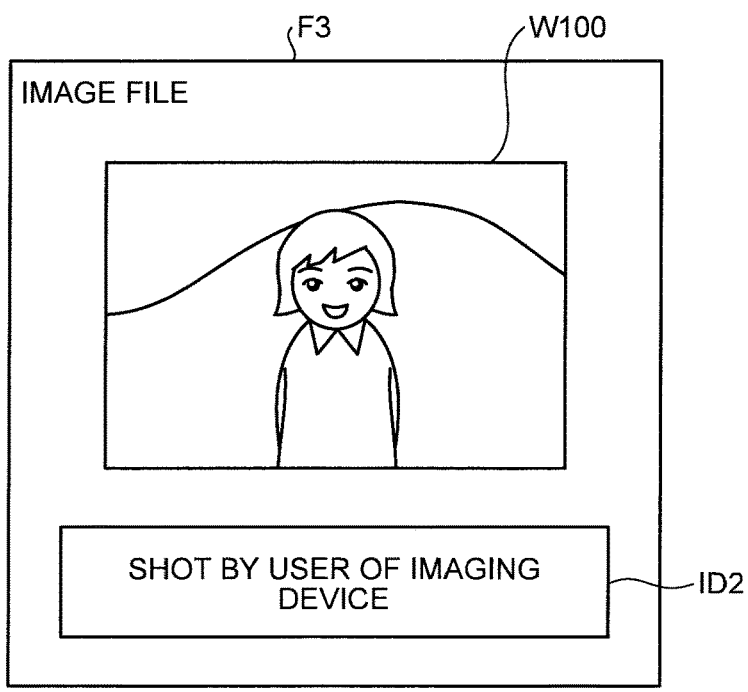
FIG. 9 is a diagram illustrating an example of an image file that is generated by the imaging device when shooting is performed as intended by a user of the imaging device without the automatic shooting instruction illustrated in (d) of FIG. 5 or the shooting reservation instruction illustrated in (f) of FIG. 7 being issued by a user of the communication device.

Shooting as Intended by User of Imaging Device with No Reference to Operation Instruction FIG. 9 is a diagram illustrating an example of an image file F3 that is generated by the imaging device 2 when shooting is performed as intended by the user of the imaging device 2 without the automatic shooting instruction or the shooting reservation instruction being issued by the user of the communication device 3.

The imaging device 2 generates an image file F3 illustrated in FIG. 9 in the case where a shooting operation is performed by the user of the imaging device 2 on the first input unit 23 in a state where, for example, the live view image W100 illustrated in (a) of FIG. 5 or (a) of FIG. 7 is displayed by the imaging device 2 without the automatic shooting instruction illustrated in (d) of FIG. 5 or the shooting reservation instruction illustrated in (f) of FIG. 7 being issued by the user of the communication device 3.

Specifically, the case described above corresponds to a case where the operation instruction information is not received (step S105: No) and the shooting operation is performed (step S115: Yes).

In this case, since the operation instruction information is not stored in the first memory unit 25, the imaging device 2 generates, in step S117, determination result information indicating shooting by the user of the imaging device 2. Then, in step S118, as illustrated in FIG. 9, the imaging device 2 generates and records the image file F3 in which the determination result information ID2 indicating shooting by the user of the imaging device 2 is associated with the live view image data corresponding to the live view image W100.

The imaging device 2 according to the first embodiment described above generates an image file in which image data generated by the imaging unit 21 is associated with determination result information about the result of determination of whether or not the image data is to be recorded according to the operation instruction that is based on the operation instruction information received from an external communication device 3, and stores the image file in the image data recording unit 27.

Accordingly, the user of the imaging device 2 may recognize, at the time of checking image data recorded in the image data recording unit 27, the determination result information that is associated with the image data. That is, the user of the imaging device 2 may determine whether the image data is recorded according to an operation instruction from an external communication device 3, or is recorded according to an operation intended by the user without the operation instruction.

Thus, with the imaging device 2 according to the first embodiment, where the responsibility regarding recording of image data lies may be made clear.

Second Embodiment

Next, a second embodiment of the present invention will be described.

In the following description, the structural elements and steps the same as those of the first embodiment described above will be denoted by the same reference signs, and detailed description thereof will be omitted, or the description will be simplified.

In the second embodiment, the imaging system 1 described in the first embodiment described above is applied to an imaging system that uses a digital camera by adopting the digital camera as the imaging device 2.

In the following, the configuration of an imaging device 2A configuring an imaging system 1A according to the second embodiment will be described. Additionally, a communication device 3 configuring the imaging system 1A is the same as the communication device 3 described in the first embodiment above, and description thereof is omitted.

Schematic Configuration of Imaging Device

Figure 10:
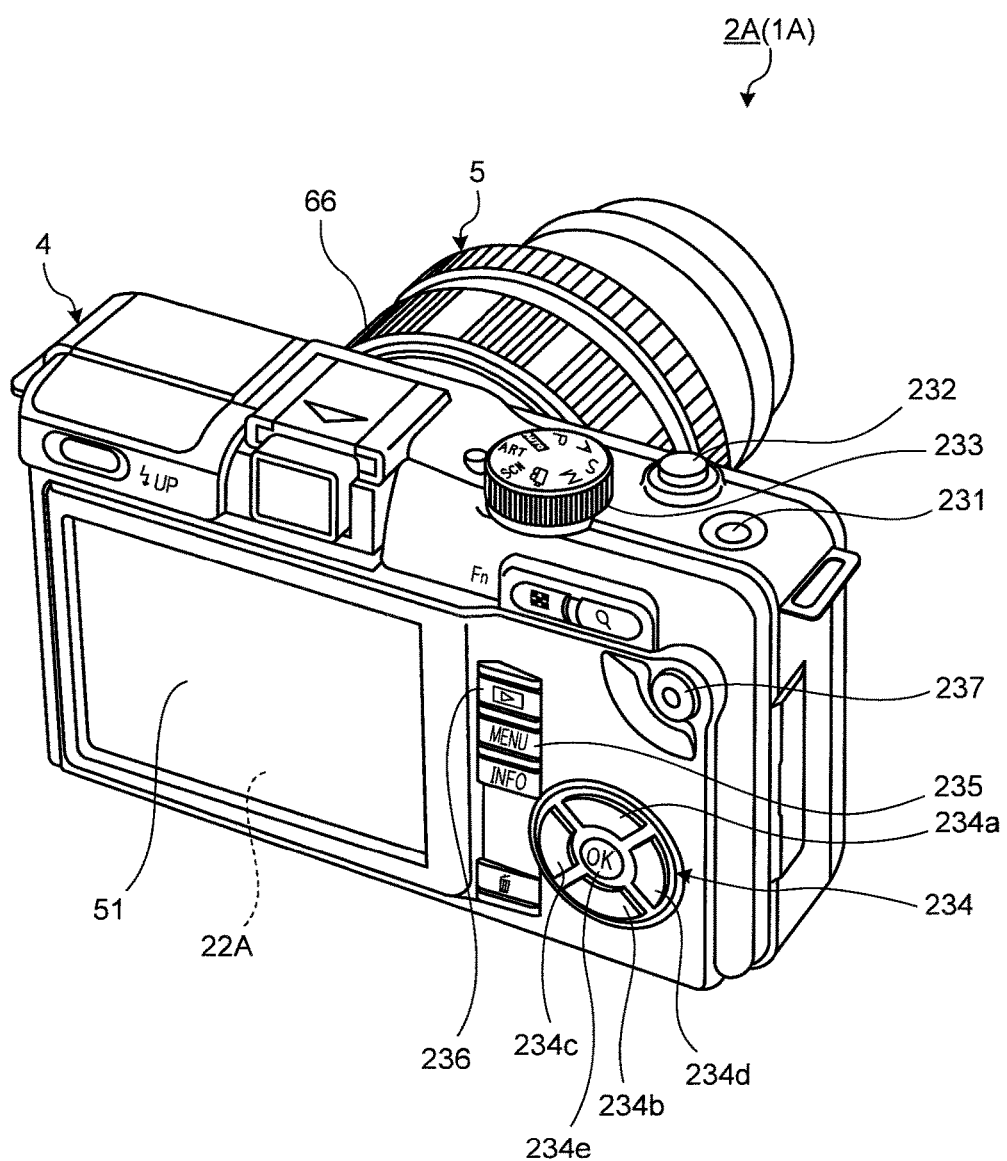
FIG. 10 is a perspective view illustrating a configuration of an imaging device according to a second embodiment of the present invention, on the side that is to face a user.
Figure 11:
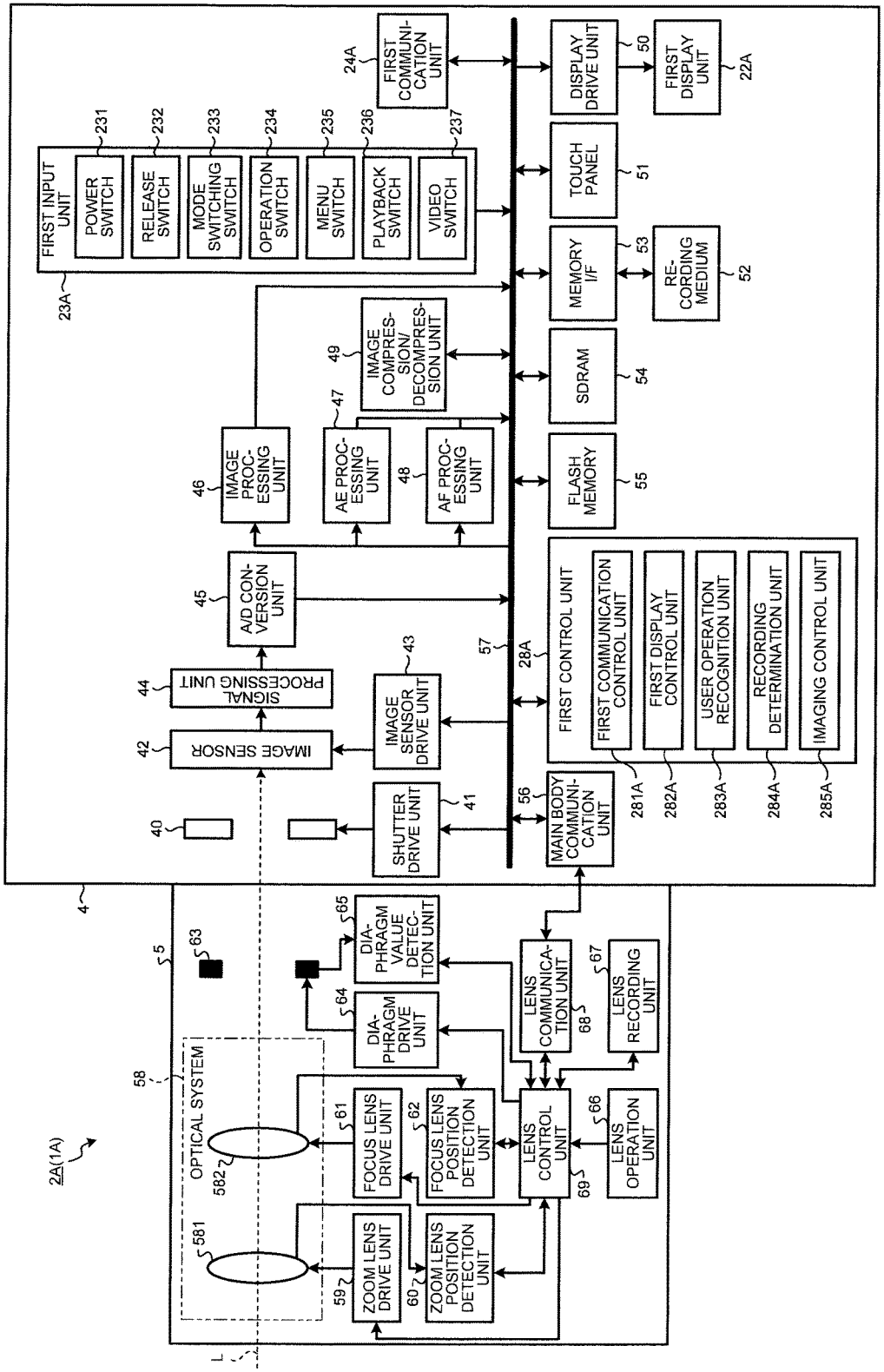
FIG. 11 is a block diagram illustrating a configuration of the imaging device illustrated in FIG. 10.

FIG. 10 is a perspective view illustrating the configuration of the imaging device 2A according to the second embodiment of the present invention, on the side that is to face the user (the front side). FIG. 11 is a block diagram illustrating the configuration of the imaging device 2A.

The imaging device 2A according to the second embodiment includes, as illustrated in FIG. 10 or FIG. 11, a main body 4, and a lens unit 5 capable of being attached to or detached from the main body 4.

Configuration of Main Body

As illustrated in FIG. 11, the main body 4 includes, in addition to a first display unit 22A, a first input unit 23A, a first communication unit 24A, and a first control unit 28A corresponding to structural elements 22 to 24 and 28 described in the first embodiment above, a shutter 40, a shutter drive unit 41, an image sensor 42, an image sensor drive unit 43, a signal processing unit 44, an A/D conversion unit 45, an image processing unit 46, an AE processing unit 47, an AF processing unit 48, an image compression/decompression unit 49, a display drive unit 50, a touch panel 51, a recording medium 52, a memory I/F 53, an SDRAM (Synchronous Dynamic Random Access Memory) 54, a flash memory 55, a main body communication unit 56, a bus 57, and the like.

The shutter 40 sets the state of the image sensor 42 to an exposure state or a light shielding state.

The shutter drive unit 41 is configured by using a stepper motor or the like, and drives the shutter 40 according to an instruction signal that is input from the first control unit 28A.

The image sensor 42 is configured by using a CCD or the like for receiving light collected by the lens unit 5 and converting the light into an electrical signal.

The image sensor drive unit 43 causes image data (an analog signal) to be output from the image sensor 42 to the signal processing unit 44 at a predetermined timing, according to an instruction signal input from the first control unit 28A.

In this sense, the image sensor drive unit 43 functions as an electronic shutter.

The signal processing unit 44 performs analog processing on the analog signal that is input from the image sensor 42, and outputs the signal to the A/D conversion unit 45.

Specifically, the signal processing unit 44 performs noise reduction processing, a gain up processing and the like on the analogy signal. For example, the signal processing unit 44 performs, on the analog signal, waveform shaping after reducing reset noise or the like, and then, performs gain up so as to achieve intended lightness.

The A/D conversion unit 45 generates digital image data (RAW data) by performing A/D conversion on the analog signal that is input from the signal processing unit 44, and outputs the data to the SDRAM 54 via the bus 57.

The image sensor 42, the signal processing unit 44, and the A/D conversion unit 45 described above function as an imaging unit of the present invention.

Under the control of the first control unit 28A, the image processing unit 46 acquires image data from the SDRAM 54 via the bus 57, and performs various types of image processing on the acquired image data. The image data on which the image processing has been performed is output to the SDRAM 54 via the bus 57.

The various types of image processing to be performed by the image processing unit 46 include basic image processing and special image processing.

The basic image processing is basic image processing including optical black subtraction processing, white balance adjustment processing, and, in the case where the image sensor is of the Bayer array, synchronization processing for image data, color matrix subtraction processing, γ correction processing, color reproduction processing, edge enhancement processing, and the like.

The special image processing is image processing for achieving visual effects such as "pop art", "fantastic focus", "toy photo", "diorama", "rough monochrome", and the like (for example, see Japanese Patent Application Laid-open No. 2010-74244, Japanese Patent Application Laid-open No. 2010-62836, and the like).

The AE processing unit 47 acquires, via the bus 57, image data that is stored in the SDRAM 54, and sets an exposure condition for still image shooting or video shooting based on the acquired image data.

Specifically, the AE processing unit 47 calculates the brightness from the image data and determines the diaphragm value, the exposure time, the ISO sensitivity, and the like based on the calculated brightness to thereby perform auto exposure of the imaging device 2A.

The AF processing unit 48 acquires, via the bus 57, image data that is stored in the SDRAM 54, and performs adjustment of auto focus of the imaging device 2A based on the acquired image data.

For example, the AF processing unit 48 performs adjustment of auto focus of the imaging device 2A by determining focusing evaluation for the imaging device 2A by extracting a signal of a high frequency component from the image data and performing AF (Auto Focus) arithmetic processing on the signal of a high frequency component.

Additionally, the adjustment method of auto focus of the imaging device 2A may be a method of acquiring a phase difference signal by the image sensor or of a type where a dedicated AF optical system or the like is mounted.

The image compression/decompression unit 49 acquires image data from the SDRAM 54 via the bus 57, compresses the acquired image data according to a predetermined format, and outputs the compressed image data to the SDRAM 54.

Here, the compression method for a still image is a JPEG (Joint Photographic Experts Group) method, a TIFF (Tagged Image File Format) method or the like. Also, the compression method for a video is a Motion JPEG method, an MP4 (H.264) method or the like.

Also, the image compression/decompression unit 49 acquires, via the bus 57 and the memory I/F 53, image data (compressed image data) or an image file (a compressed image file) that is recorded in the recording medium 52, decompresses (expands) the acquired image data or image file, and outputs the same to the SDRAM 54.

The first input unit 23A according to the second embodiment receives a user operation, and outputs an instruction signal according to the user operation to the first control unit 28A via the bus 57.

As illustrated in FIG. 10 or FIG. 11, the first input unit 23A includes a power switch 231 for switching the power state of the imaging device 2A between an on state and an off state, a release switch 232 for outputting a still image release signal and issuing an instruction regarding still image shooting, a mode switching switch 233 for switching between modes of the imaging device 2A (shooting modes (a still image shooting mode and a video shooting mode), a playback mode, and the like), an operation switch 234 for switching between various settings of the imaging device 2A, a menu switch 235 for displaying various settings of the imaging device 2A on the first display unit 22A, a playback switch 236 for displaying an image corresponding to image data or an image file recorded in the recording medium 52 on the first display unit 22A, a video switch 237 for outputting a video release signal and issuing an instruction regarding video shooting, and the like.

The release switch 232 may be moved forward or backward by an external pressure, and when it is pressed halfway, it outputs a first release signal to the first control unit 28A and issues an instruction regarding shooting preparation operation, and when it is pressed all the way, it outputs a second release signal to the first control unit 28A and issues an instruction regarding still image shooting.

The operation switch 234 includes direction switches 234a to 234d for up/down/left/right used to perform selection setting on a menu screen or the like, and a determination switch 234e (an OK switch) for determining the operation by each of the direction switches 234a to 234d on the menu screen or the like (FIG. 10). Additionally, the operation switch 234 may alternatively be configured by using a dial switch or the like.

Under the control of the first control unit 28A, the display drive unit 50 acquires, via the bus 57, image data that is stored in the SDRAM 54 (image data obtained by performing basic image processing or special image processing on the RAW data) or image data, an image file or the like that is recorded in the recording medium 52, and causes the first display unit 22A to display an image corresponding to the acquired image data or image file.

Here, display of an image includes live view display of displaying a live view image corresponding to image data that is obtained by performing basic image processing or special image processing on the RAW data, rec view display of displaying an image corresponding to image data immediately after shooting for a predetermined period of time, playback display of playing back image data or an image file recorded in the recording medium 52, and the like.

Also, the first display unit 22A according to the second embodiment displays operation information of the imaging device 2A and information about an operation as appropriate.

The first communication unit 24A according to the second embodiment performs, under the control of the first control unit 28A, wireless communication, with a communication device which is a communication counterpart set by the user of the imaging device 2A on the menu screen or the like (in the second embodiment, the communication device 3 (see FIG. 1)), of various types of data including live view image data and signals necessary for communication, according to a predetermined protocol.

In the second embodiment, the live view image data is image data that is stored in the SDRAM 54 and that is to be used for live view display (image data that is obtained by performing basic image processing or special image processing on the RAW data).

As illustrated in FIG. 10, the touch panel 51 is provided on the display screen of the first display unit 22A, and detects a touch by an object from outside and outputs a position signal according to the detected touch position.

Here, the touch panel is generally a resistive film touch panel, a capacitive touch panel, an optical touch panel, or the like. As the touch panel 51 of the second embodiment, a touch panel of any method is applicable.

The recording medium 52 has a function as a recording unit according to the present invention.

Specifically, the recording medium 52 is configured by using a memory card or the like that is mounted on the imaging device 2A from outside, and is mounted to the imaging device 2A via the memory I/F 53 in an attachable/detachable manner.

Image data or an image file which has been processed by the image processing unit 46 or the image compression/decompression unit 49 is written to the recording medium 52 by a read/write device, not illustrated, according to the type of the recording medium 52, or image data or an image file recorded in the recording medium 52 is read by the read/write device. Also, the recording medium 52 may output, under the control of the first control unit 28A, programs and various pieces of information to the flash memory 55 via the memory I/F 53 and the bus 57.

The SDRAM 54 is configured by using a volatile memory, and temporarily stores image data that is input from the A/D conversion unit 45 via the bus 57 (RAW data), image data that is obtained by performing basic image processing or special image processing on the RAW data by the image processing unit 46, recording planned image data that is planned to be recorded in the recording medium 52, and information of the imaging device 2A which is being processed.

The flash memory 55 is configured by using a non-volatile memory.

The flash memory 55 records various programs (including an imaging program) for causing the imaging device 2A to operate, various types of data to be used during execution of programs, various parameters that are necessary for image processing operation by the image processing unit 46, and the like.

The main body communication unit 56 is a communication interface for performing communication with the lens unit 5 mounted on the main body 4.

The bus 57 is configured by using a transmission channel or the like for connecting each structural element of the imaging device 2A, and transfers various types of data generated inside the imaging device 2A to each structural element of the imaging device 2A.

The first control unit 28A according to the second embodiment controls the operation of the imaging device 2A in an overall manner by, for example, issuing an instruction or performing transfer of data, via the bus 57, to a corresponding unit configuring the imaging device 2A according to an instruction signal from the first input unit 23A, a position signal from the touch panel 51, operation instruction information received by the first communication unit 24A, or the like.

For example, in the case where a second release signal is input, or an operation instruction that is based on the operation instruction information received by the first communication unit 24A is the automatic shooting instruction, the first control unit 28A performs control of starting a shooting operation by the imaging device 2A.

The shooting operation by the imaging device 2A here refers to operations of the signal processing unit 44, the A/D conversion unit 45, and the image processing unit 46 for performing predetermined processing on image data output by the image sensor 42 according to driving by the shutter drive unit 41 and the image sensor drive unit 43. Image data which has been processed in the above manner is provisionally recorded in the SDRAM 54 as the recording planned image data, under the control of the first control unit 28A, and then, is generated as an image file in which determination result information or the like is associated with the data. Also, the image file is compressed by the image compression/decompression unit 49, and is recorded in the recording medium 52 via the bus 57 and the memory I/F 53.

As illustrated in FIG. 11, the first control unit 28A includes a first communication control unit 281A, a first display control unit 282A, a user operation recognition unit 283A, a recording determination unit 284A, and an imaging control unit 285A corresponding, respectively, to the structural elements 281 to 285 of the first control unit 28 described in the first embodiment above.

The main body 4 configured in the above manner may be provided with an audio input/output function, a flash function, an electronic viewfinder (EVF) capable of being attached or detached, and the like.

Configuration of Lens Unit

As illustrated in FIG. 11, the lens unit 5 includes an optical system 58, a zoom lens drive unit 59, a zoom lens position detection unit 60, a focus lens drive unit 61, a focus lens position detection unit 62, a diaphragm 63, a diaphragm drive unit 64, a diaphragm value detection unit 65, a lens operation unit 66, a lens recording unit 67, a lens communication unit 68, and a lens control unit 69.

The optical system 58 collects light in a predetermined field of view area, and forms an image on an imaging surface of the image sensor 42 based on the collected light. As illustrated in FIG. 11, the optical system 58 includes a zoom lens 581, and a focus lens 582.

The zoom lens 581 is configured by using one or a plurality of lenses, and changes the zoom magnification of the optical system 58 by moving along an optical axis L (FIG. 11).

The focus lens 582 is configured by using one or a plurality of lenses, and changes the point of focus and the focal length of the optical system 58 by moving along the optical axis L.

The zoom lens drive unit 59 is configured by using a stepper motor, a DC motor and the like, and causes the zoom lens 581 to move along the optical axis L under the control of the lens control unit 69.

The zoom lens position detection unit 60 is configured by using a photointerrupter and the like, and detects the position of the zoom lens 581 moved by the zoom lens drive unit 59.

Specifically, the zoom lens position detection unit 60 converts the number of rotations of a drive motor included in the zoom lens drive unit 59 into the number of pulses, and detects the position of the zoom lens 581 on the optical axis L based on a specific reference position determined in advance, based on the number of pulses after conversion.

The focus lens drive unit 61 is configured by using a stepper motor, a DC motor and the like, and causes the focus lens 582 to move along the optical axis L under the control of the lens control unit 69.

The focus lens position detection unit 62 is configured by using a photointerrupter and the like, and detects the position on the optical axis L of the focus lens 582 moved by the focus lens drive unit 61 by the same method as that of the zoom lens position detection unit 60.

The diaphragm 63 performs adjustment of exposure by limiting the amount of incidence of light collected by the optical system 58.

The diaphragm drive unit 64 is configured by using a stepper motor and the like, and adjusts the amount of light entering the image sensor 42 by driving the diaphragm 63 under the control of the lens control unit 69.

The diaphragm value detection unit 65 detects the diaphragm value of the diaphragm 63 by detecting the state of the diaphragm 63 driven by the diaphragm drive unit 64. The diaphragm value detection unit 65 is configured by using a potentiometer such as a linear encoder or a variable resistance element, an A/D conversion circuit, and the like.

As illustrated in FIG. 10, the lens operation unit 66 is an operation ring or the like that is provided around the lens barrel of the lens unit 5, and receives a user operation regarding an instruction regarding the operation of the zoom lens 581 or the focus lens 582 in the optical system 58 or the operation of the imaging device 2A. Additionally, the lens operation unit 66 may be a push-type switch or the like.

The lens recording unit 67 records control programs for determining the position and the movement of the optical system 58 and the diaphragm 63, the magnification, the focal length, the field of view, the aberration and the F value (brightness) of the optical system 58, and the like.

The lens communication unit 68 is a communication interface for performing communication with the main body communication unit 56 of the main body 4 when the lens unit 5 is mounted on the main body 4.

The lens control unit 69 is configured by using a CPU and the like, and controls the operation of the lens unit 5 according to an instruction signal or a drive signal from the first control unit 28A input via the main body communication unit 56 and the lens communication unit 68.

Also, the lens control unit 69 outputs, to the first control unit 28A, via the main body communication unit 56 and the lens communication unit 68, the position of the zoom lens 581 detected by the zoom lens position detection unit 60, the position of the focus lens 582 detected by the focus lens position detection unit 62, and the diaphragm value of the diaphragm 63 detected by the diaphragm value detection unit 65.

Operation of Imaging System

Next, the operation of the imaging system 1A according to the second embodiment will be described.

Here, the operation of the communication device 3 according to the second embodiment is the same as the operation of the communication device 3 described in the first embodiment (FIG. 3). Accordingly, in the following, only the operation of the imaging device 2A (an imaging method according to the present invention) will be described.

Operation of Imaging Device

Figure 12:
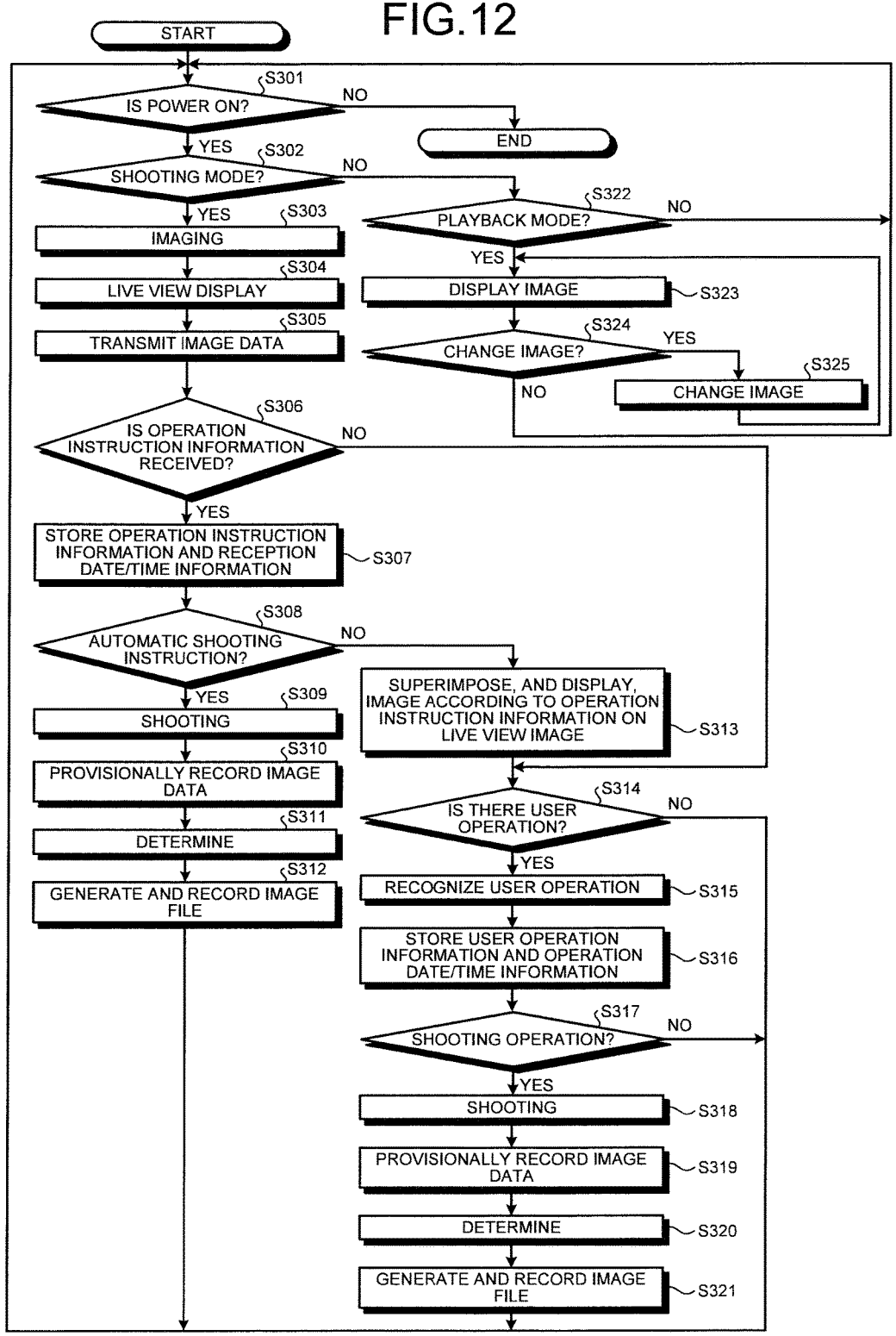
FIG. 12 is a flow chart illustrating an operation of the imaging device illustrated in FIGS. 10 and 11.

FIG. 12 is a flow chart illustrating an operation of the imaging device 2A according to the second embodiment.

Additionally, for the sake of convenience of description, in FIG. 12, the operation of the imaging device 2A in a case where the imaging device 2A is set to a communication mode (a mode of performing communication with the communication device 3) on the menu screen, for example, by the user of the imaging device 2A is illustrated. Also in the following, description will be given assuming that the imaging device 2A is set to the communication mode.

When the power of the imaging device 2A is turned on by operation of the power switch 231 by the user of the imaging device 2A (step S301: Yes), the first control unit 28A determines whether or not the imaging device 2A is set to a shooting mode by the operation of the mode switching switch 233 by the user of the imaging device 2A (step S302).

When it is determined that the imaging device 2A is set to the shooting mode (step S302: Yes), the first control unit 28A starts imaging by the image sensor 42 (step S303).

Specifically, the first control unit 28A drives the image sensor drive unit 43 to thereby perform shooting by an electronic shutter. Also, the image processing unit 46 performs basic image processing or special image processing on image data that is generated by the image sensor 42 by shooting by the electronic shutter and stored in the SDRAM 54.

Next, the first display control unit 282A causes the first display unit 22A to start live view display (step S304).

Specifically, the first display control unit 282A causes the first display unit 22A to sequentially display a live view image corresponding to the latest live view image data which has been subjected to the basic image processing or the special image processing by the image processing unit 46 and stored in the SDRAM 54.

Next, the first communication control unit 281A causes the latest live view image data that is stored in the SDRAM 54 (the same image data as that of the live view image that is displayed by the first display unit 22A in step S304) to be sequentially transmitted to the communication device 3 via the first communication unit 24A (step S305).

Additionally, for the sake of convenience of description, in FIG. 12, step S305 is illustrated to be performed after step S304, but in reality, steps S304 and S305 are performed approximately at the same time.

Now, in remote camera shooting using the imaging system 1A according to the second embodiment, to make clear where the responsibility regarding the copyright or the personality rights arising at the time of shooting, or regarding shooting in a shooting prohibited area, for example, lies is a matter of great importance that must be considered. To prevent troubles regarding the responsibilities as described above, position information such as GPS information indicating the use state of the imaging device 2A or information about the attitude, such as height or inclination, of the imaging device 2A based on atmospheric pressure or inclination determination may be transmitted in step S305 together with the live view image data, or the user of the imaging device 2A may perform an operation on the imaging device 2A (corresponding to a recording permission operation or a recording prohibition operation according to the present invention) to thereby transmit a signal indicating external shooting prohibition or permission (corresponding to recording prohibition information or recording permission information according to the present invention) in step S305 together with the live view image data. In the case where such a signal (the signal indicating external shooting prohibition or permission, for example) is transmitted, external shooting prohibition information indicating external shooting prohibition (corresponding to the recording prohibition information according to the present invention) or external shooting permission information indicating external shooting permission (corresponding to the recording permission information according to the present invention) may be recorded in step S312 or S321 described later, in association with the image data. Furthermore, the user of the imaging device 2A may operate the imaging device 2A (a responsibility acceptance operation or a responsibility abandonment operation according to the present invention) to thereby cause first responsibility acceptance information indicating that the user of the imaging device 2A accepts the responsibility of shooting by the imaging device 2A or first responsibility abandonment information indicating abandonment of the responsibility by the user of the imaging device 2A to be transmitted in step S305 together with the live view image data. In the case where such first responsibility acceptance information or first responsibility abandonment information is transmitted, the first responsibility acceptance information or the first responsibility abandonment information may be recorded in step S312 or S321 described later, in association with the image data. Additionally, with respect to the information to be transmitted in step S305, information regarding various settings of the imaging device 2A, such as shooting parameters, may of course be transmitted.

Subsequently, as in step S105 described in the first embodiment above, the first communication control unit 281A determines whether or not operation instruction information is received (step S306).

If it is determined that operation instruction information is not received (step S306: No), the imaging device 2A proceeds to step S314.

On the other hand, if it is determined that operation instruction information is received (step S306: Yes), the first control unit 28A stores in association with each other, in the SDRAM 54, the operation instruction information and reception date/time information regarding the time and date of reception of the operation instruction information (step S307).

Then, as in step S107 described in the first embodiment above, the imaging control unit 285A determines whether or not the operation instruction that is based on the operation instruction information received by the first communication unit 24A is the automatic shooting instruction (step S308).

If the automatic shooting instruction is determined (step S308: Yes), the imaging control unit 285A performs shooting (step S309: shooting step).

Specifically, in step S309, the imaging control unit 285A performs shooting by a mechanical shutter by driving the shutter drive unit 41 and the image sensor drive unit 43. Also, the image processing unit 46 performs basic image processing or special image processing on image data that is generated by the image sensor 42 by shooting by the mechanical shutter and stored in the SDRAM 54.

Next, the imaging control unit 285A provisionally records in association with each other, in the SDRAM 54, recording planned image data generated by the shooting in step S309 (the image data generated by the shooting by the mechanical shutter and subjected to basic image processing or special image processing) and shooting date/time information regarding the time and date of the shooting (step S310).

Then, as in step S109 described in the first embodiment described above, the recording determination unit 284A generates, based on the operation instruction information (the automatic shooting instruction) stored in the SDRAM 54, determination result information indicating shooting by an external request (step S311: determination step).

Then, the imaging control unit 285A recognizes, based on previous shooting date/time information which is provisionally recorded in the SDRAM 54 in step S310 or S319 based on the previous shooting (step S309 or S318) and current shooting date/time information which is provisionally recorded in the SDRAM 54 in step S310 based on the current shooting (step S309), the time and date of the previous shooting and the time and date of the current shooting. Also, while referring to the reception date/time information and operation date/time information stored in the SDRAM 54 in steps S307 and S316 in association with the operation instruction information and the user operation information, the imaging control unit 285A reads all the pieces of operation instruction information received and all the pieces of user operation information recognized by the user operation recognition unit 283A from the time and date of the previous shooting to the time and date of the current shooting. Furthermore, the imaging control unit 285A generates history information in which all the pieces of operation instruction information and user operation information which have been read are arranged in chronological order. Then, the imaging control unit 285A reads the recording planned image data provisionally recorded in the SDRAM 54 in step S310, and generates an image file in which the determination result information generated in step S311 and the history information are associated with the recording planned image data. Also, the imaging control unit 285A causes the image compression/decompression unit 49 to compress the image file, and records the compressed image file in the recording medium 52 (step S312: recording step). Then, the imaging device 2A returns to step S301.

Figure 13A:
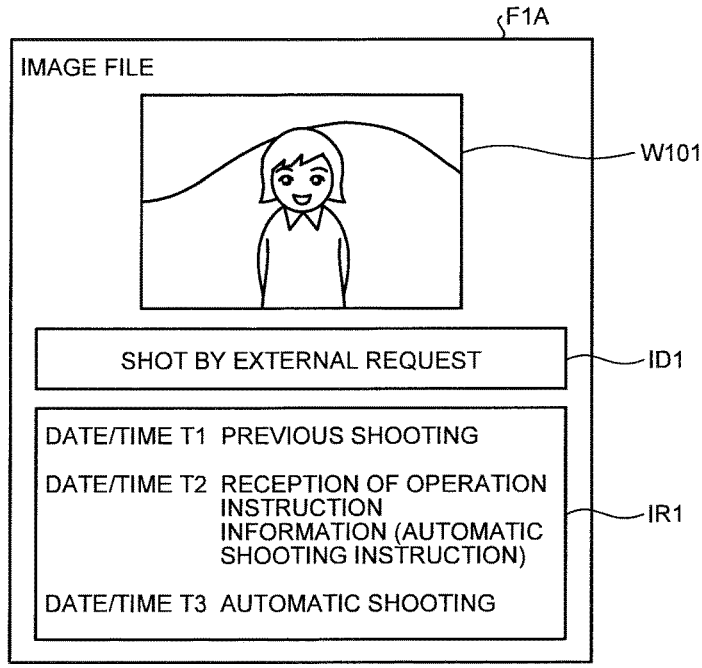
FIG. 13A is a diagram illustrating an example of an image file that is generated by the imaging device illustrated in FIGS. 10 and 11 according to the automatic shooting instruction illustrated in (d) of FIG. 5.

FIG. 13A is a diagram illustrating an example of an image file F1A that is generated by the imaging device 2A according to the automatic shooting instruction illustrated in (d) of FIG. 5.

Specifically, FIG. 13A is a diagram corresponding to FIGS. 4 to 6, and illustrates an example of an image file F1A that is generated by the imaging device 2A when the automatic shooting instruction illustrated in (d) of FIG. 5 is issued by the user of the communication device 3.

For example, as illustrated in FIG. 13A, when the user of the communication device 3 issues the automatic shooting instruction illustrated in (d) of FIG. 5, the imaging device 2A according to the second embodiment generates an image file F1A that is different from the image file F1 (FIG. 6) described in the first embodiment above (step S312).

Specifically, the image file F1A is an image file in which, in addition to determination result information ID1 indicating shooting by an external request (shooting according to the automatic shooting instruction), history information IR1 is associated with live view image data corresponding to a live view image W101.

The history information IR1 is information indicating reception history of the operation instruction information and operation history of the user operation from the previous shooting to the current shooting.

In the example of FIG. 13A, a case is illustrated where the operation instruction information (the automatic shooting instruction) has been received once and no user operation has been performed from the previous shooting to the current shooting. Accordingly, the history information IR1 is information in which three histories, the previous shooting (date/time T1), reception of the operation instruction information (the automatic shooting instruction) (date/time T2), and automatic shooting which is the current shooting (date/time T3), are arranged in a chronological order.

Referring back to step S308, if other than the automatic shooting instruction is determined (step S308: No), the first display control unit 282A superimposes, as in step S111 described in the first embodiment above, an image according to the operation instruction information on the live view image, and causes the first display unit 22A to display the superimposed image for a predetermined period of time (step S313).

After step S313, or in the case where it is determined that operation instruction information is not received (step S306: No), the user operation recognition unit 283A determines, as in step S112 described in the first embodiment above, whether or not there is a user operation (step S314).

If it is determined that there is no user operation (step S314: No), the imaging device 2A returns to step S301.

On the other hand, if it is determined that there is a user operation (step S314: Yes), the user operation recognition unit 283A recognizes the content of the user operation (step S315: user operation recognition step). Then, the user operation recognition unit 283A stores in association with each other, in the SDRAM 54, user operation information regarding the user operation and operation date/time information regarding the time and date of recognition of the user operation (step S316).

Then, the user operation recognition unit 283A determines whether or not the user operation recognized in step S315 is a shooting operation (input of a second release signal from the release switch 232) (step S317).

If other than the shooting operation is determined (step S317: No), the imaging device 2A returns to step S301.

On the other hand, if the shooting operation is determined (step S317: Yes), the imaging control unit 285A performs shooting as in steps S309 and S310 (step S318: shooting step), and also, provisionally records in association with each other, in the SDRAM 54, recording planned image data generated by the shooting and the shooting date/time information (step S319).

Subsequently, as in step S117 described in the first embodiment above, the recording determination unit 284A determines whether or not the recording planned image data is to be recorded according to an operation instruction from outside, based on at least one of the operation instruction information and the user operation information stored in the SDRAM 54, and generates determination result information regarding the result of the determination (step S320: determination step).

Then, as in step S312, the imaging control unit 285A generates an image file in which the determination result information generated in step S320 and the generated history information are associated with the recording planned image data that is provisionally recorded in the SDRAM 54 in step S319. Then, the imaging control unit 285A causes the image compression/decompression unit 49 to compress the image file, and records the compressed image file in the recording medium 52 (step S321: recording step). Then, the imaging device 2A returns to step S301.

Figure 13B:
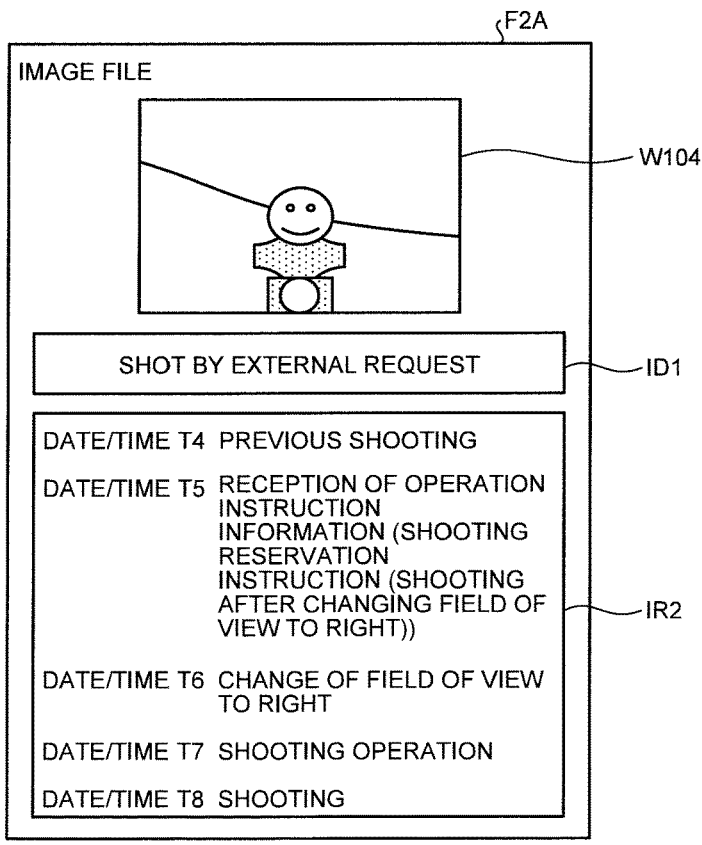
FIG. 13B is a diagram illustrating an example of an image file that is generated by the imaging device illustrated in FIGS. 10 and 11 according to the shooting reservation instruction illustrated in (f) of FIG. 7.

FIG. 13B is a diagram illustrating an example of an image file F2A that is generated by the imaging device 2A according to the shooting reservation instruction illustrated in (f) of FIG. 7.

Specifically, FIG. 13B is a diagram corresponding to FIGS. 4, 7 and 8, and illustrates an example of an image file F2A that is generated by the imaging device 2A when the shooting reservation instruction illustrated in (f) of FIG. 7 is issued by the user of the communication device 3.

For example, when the user of the communication device 3 issues the shooting reservation instruction illustrated in (f) of FIG. 7, and the user of the imaging device 2A performs an operation according to the shooting reservation instruction, the imaging device 2A according to the second embodiment generates an image file F2A that is different from the image file F2 (FIG. 8) described in the first embodiment above, as illustrated in FIG. 13B (step S321).

Specifically, the image file F2A is an image file in which, in addition to determination result information ID1 indicating shooting by an external request, history information IR2 is associated with live view image data corresponding to the live view image W104.

The history information IR2 is information indicating reception history of the operation instruction information and operation history of the user operation from the previous shooting to the current shooting.

In the example of FIG. 13B, a case is illustrated where the operation instruction information (the shooting reservation instruction) has been received once and two user operations (an operation of changing the field of view to the right, and the shooting operation) have been performed from the previous shooting to the current shooting. Accordingly, the history information IR2 is information in which five histories, the previous shooting (date/time T4), reception of the operation instruction information (the shooting reservation instruction (shooting after changing the field of view to the right)) (date/time T5), the user operation information indicating the operation of changing the field of view to the right (date/time T6), the user operation information indicating the shooting operation (date/time T7), and the current shooting (date/time T8), are arranged in a chronological order.

Additionally, although not specifically illustrated, in the case where the user of the imaging device 2A has not performed an operation according to the shooting reservation instruction illustrated in (f) of FIG. 7 (in the case where the user has moved the direction of the imaging device 2A to the left, and performed the shooting operation), the imaging device 2A generates the following image file.

That is, since the shooting reservation instruction is not followed, the image file is the image file F2A illustrated in FIG. 13B in which the determination result information ID1 is the determination result information indicating shooting by the user of the imaging device 2A, and the user operation information for the date/time T6 in the history information IR2 is the user operation information indicating the operation for changing the field of view to the left.

Figure 13C:
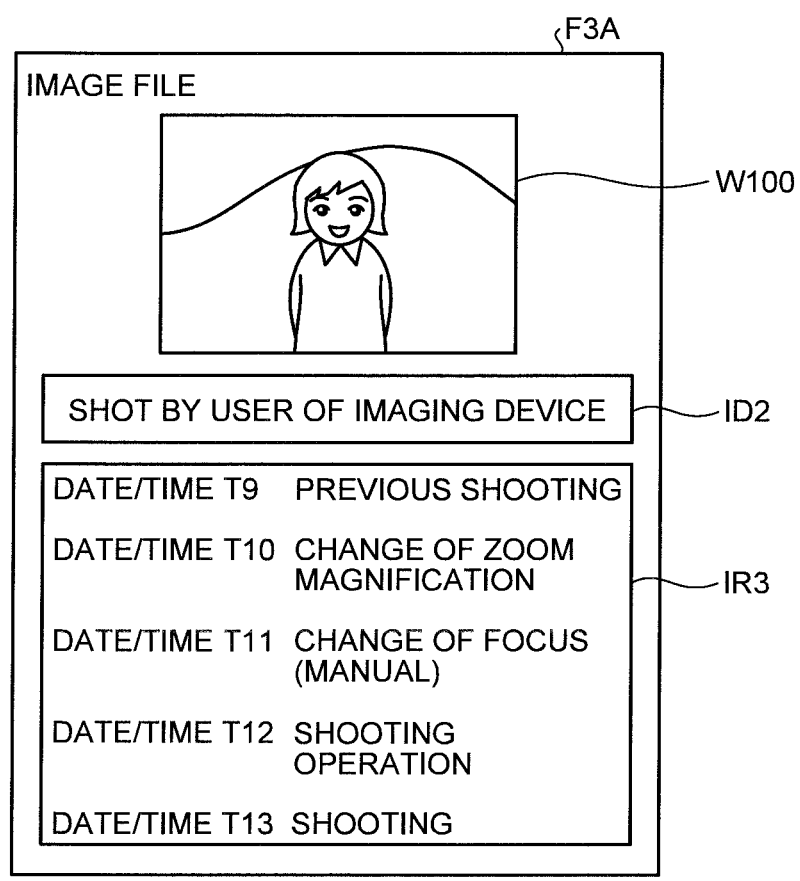
FIG. 13C is a diagram illustrating an example of an image file that is generated by the imaging device when shooting is performed as intended by a user of the imaging device illustrated in FIGS. 10 and 11 without the automatic shooting instruction illustrated in (d) of FIG. 5 or the shooting reservation instruction illustrated in (f) of FIG. 7 being issued by a user of the communication device.

FIG. 13C is a diagram illustrating an example of an image file F3A that is generated by the imaging device 2A when shooting is performed as intended by the user of the imaging device 2A without the automatic shooting instruction or the shooting reservation instruction being issued by the user of the communication device 3.

Specifically, FIG. 13C is a diagram corresponding to FIGS. 4, 5, 7 and 9, and illustrates an example of an image file F3A that is generated by the imaging device 2A when an shooting operation is performed by the user of the imaging device 2A in a state where the live view image W100 illustrated in (a) of FIG. 5 and (a) of FIG. 7 is displayed by the imaging device 2A and where the automatic shooting instruction illustrated in (d) of FIG. 5 or the shooting reservation instruction illustrated in (f) of FIG. 7 is not issued by the user of the communication device 3.

For example, in the case described above, the imaging device 2A according to the second embodiment generates an image file F3A that is different from the image file F3 (FIG. 9) described in the first embodiment above, as illustrated in FIG. 13C (step S321).

Specifically, the image file F3A is an image file in which, in addition to determination result information ID2 indicating shooting by the user of the imaging device 2A, history information IR3 is associated with live view image data corresponding to the live view image W100.

The history information IR3 is information indicating reception history of the operation instruction information and operation history of the user operation from the previous shooting to the current shooting.

In the example of FIG. 13C, a case is illustrated where the operation instruction information has not been received and three user operations (an operation for changing the zoom magnification, an operation for changing the focus (manual), and the shooting operation) have been performed from the previous shooting to the current shooting. Accordingly, the history information IR3 is information in which five histories, the previous shooting (date/time T9), the user operation information indicating the operation for changing the zoom magnification (date/time T10), the user operation information indicating the operation for changing the focus (manual) (date/time T11), the user operation information indicating the shooting operation (date/time T12), and the current shooting (date/time T13), are arranged in a chronological order.

Referring back to step S302, if it is determined that the imaging device 2A is not set to the shooting mode (step S302: No), the first control unit 28A determines whether or not the imaging device 2A is set to the playback mode by the operation of the mode switching switch 233 by the user of the imaging device 2A (step S322).

If it is determined that the imaging device 2A is not set to the playback mode (step S322: No), the imaging device 2A returns to step S301.

On the other hand, if it is determined that the imaging device 2A is set to the playback mode (step S322: Yes), the first display control unit 282A causes the first display unit 22A to display an image corresponding to the image data or the image file recorded in the recording medium 52 (for example, see FIGS. 13A to 13C) (step S323).

Next, the first display control unit 282A determines whether or not an instruction signal which is an instruction to change the image is input by the operation of the first input unit 23A or the touch panel 51 by the user of the imaging device 2A (step S324).

In the case where it is determined that an instruction signal which is an instruction to change the image is input (step S324: Yes), the first display control unit 282A changes the image to be displayed by the first display unit 22A (step S325). After step S325, the imaging device 2A returns to step S323.

On the other hand, in the case where it is determined that an instruction signal which is an instruction to change the image is not input (step S324: No), the imaging device 2A returns to step S301.

According to the second embodiment described above, the following effect may be achieved in addition to the same effect as that of the first embodiment described above.

The imaging device 2A according to the second embodiment generates, and records in the recording medium 52, an image file in which recording planned image data is associated with, in addition to determination result information, history information in which all the pieces of operation instruction information received from the previous shooting to the current shooting and user operation information regarding all the user operations performed from the previous shooting to the current shooting are arranged in a chronological order.

Thus, at the time of checking the image data recorded in the recording medium 52, the user of the imaging device 2A may check the history information that is associated with the image data to thereby accurately grasp what operation instructions were issued and what operations were performed to perform the shooting.

Example Modification of Second Embodiment

In the second embodiment described above, the main body 4 and the lens unit 5 are separately configured, but this is not restrictive, and the main body 4 and the lens unit 5 may alternatively be integrally configured.

Also, in the second embodiment described above, at the time of generating an image file (steps S312, S321), the image file is generated in which determination result information and history information including both the operation instruction information and the user operation information are associated with recording planned image data, but this is not restrictive. For example, it is also possible to generate an image file in which the determination result information and one of the operation instruction information and the user operation information are associated with the recording planned image data.

Also, in the second embodiment described above, with respect to the history information to be associated with the recording planned image data, histories regarding previous shooting and current shooting may be omitted as long as the operation instruction information and the user operation information are included.

Third Embodiment

Next, a third embodiment of the present invention will be described.

In the following description, the structural elements and steps the same as those of the first embodiment described above will be denoted by the same reference signs, and detailed description thereof will be omitted, or the description will be simplified.

An imaging system according to the third embodiment includes, in addition to the functions the same as those of the imaging system described in the first embodiment above, a function of urging, by the user of a communication device inputting to the communication device a specific position shooting instruction (an operation instruction) regarding an instruction of shooting from a specific position, the user of the imaging device at a location away from the user of the communication device to recognize the operation instruction via the imaging device and to perform an operation on the imaging device according to the operation instruction.

Configuration of Imaging System

Figure 14:
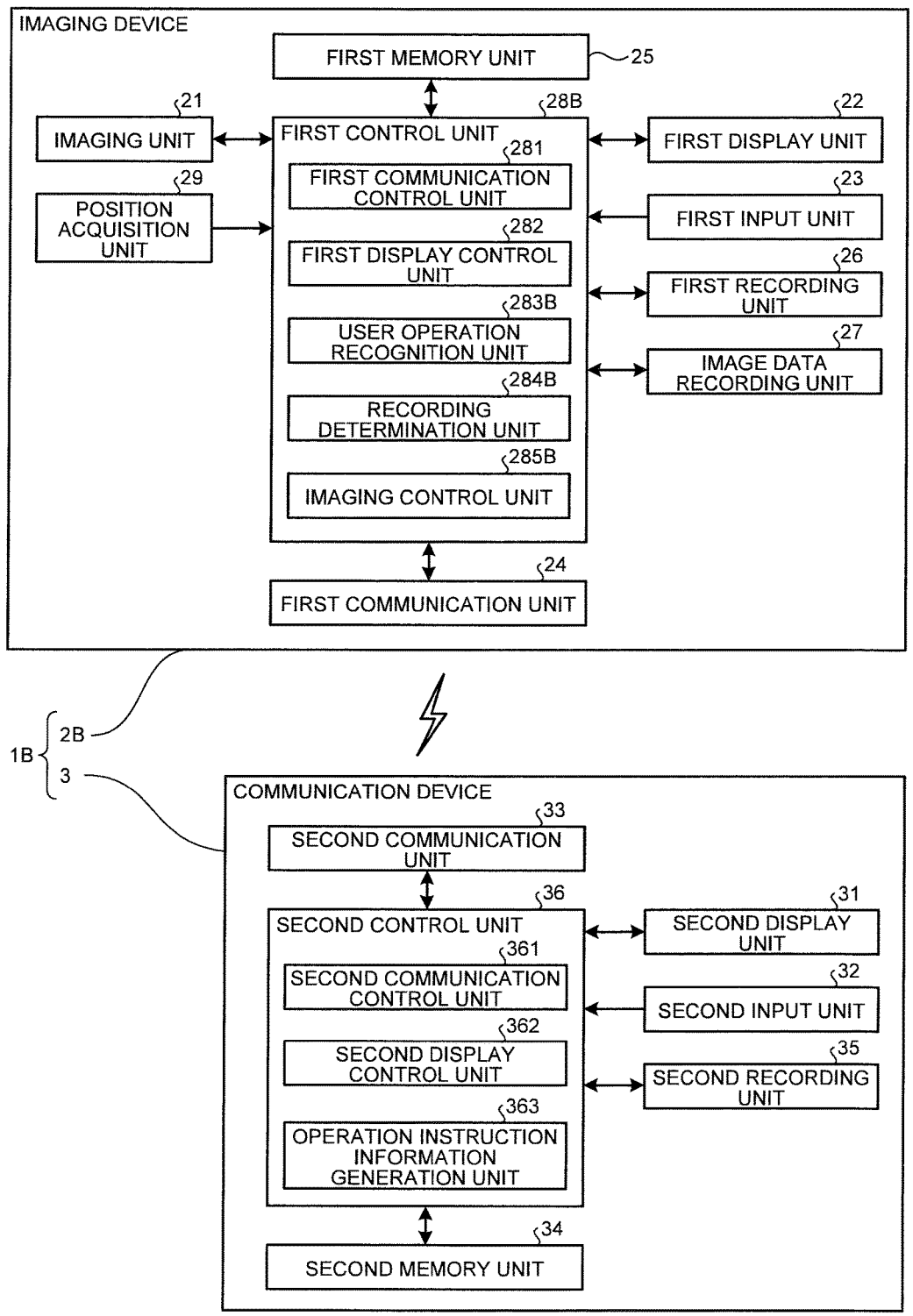
FIG. 14 is a block diagram illustrating a configuration of an imaging system according to a third embodiment of the present invention.

FIG. 14 is a block diagram illustrating the configuration of an imaging system 1B according to the third embodiment.

In the following, the configuration of an imaging device 2B configuring the imaging system 1B according to the third embodiment will be described. Additionally, as illustrated in FIG. 14, the configuration of a communication device 3 configuring the imaging system 1B is the same as that of the communication device 3 (FIG. 1) described in the first embodiment above, and description thereof will be omitted.

Configuration of Imaging Device

As illustrated in FIG. 14, the imaging device 2B is the imaging device 2 (FIG. 1) described in the first embodiment above to which a position acquisition unit 29 is added.

The position acquisition unit 29 receives orbit information of satellites transmitted from a plurality of GPS satellites configuring a GPS which is measurement means for measuring the position of an object on the earth, and acquires position information (information about longitude and latitude) of the imaging device 2B based on the received orbit information. Then, the position acquisition unit 29 outputs the position information of the imaging device 2B to a first control unit 28B.

Additionally, a user operation recognition unit 283B, a recording determination unit 284B, and an imaging control unit 285B configuring the first control unit 28B are structural elements corresponding, respectively, to the user operation recognition unit 283, the recording determination unit 284, and the imaging control unit 285 described in the first embodiment above, but the functions are partially changed from those of the user operation recognition unit 283, the recording determination unit 284, and the imaging control unit 285 according to the addition of the position acquisition unit 29.

Operation of Imaging System

Next, the operation of the imaging system 1B according to the third embodiment will be described.

Here, the operation of the communication device 3 according to the third embodiment is the same as the operation of the communication device 3 (FIG. 3) described in the first embodiment above. Accordingly, in the following, only the operation of the imaging device 2B (an imaging method according to the present invention) will be described.

Operation of Imaging Device

Figure 15:
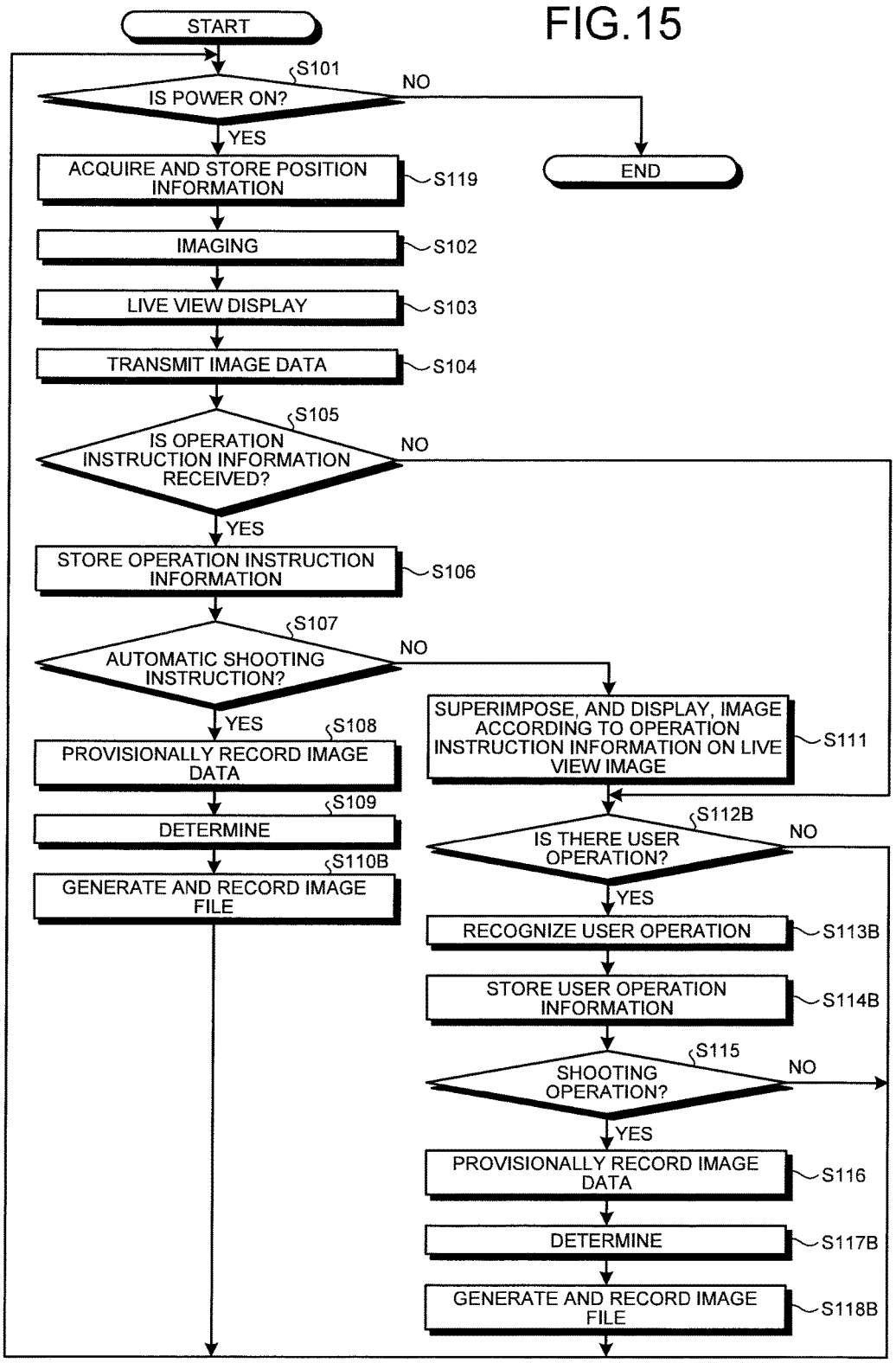
FIG. 15 is a flow chart illustrating an operation of the imaging device illustrated in FIG. 14.

FIG. 15 is a flow chart illustrating the operation of the imaging device 2B according to the third embodiment.

As illustrated in FIG. 15, the operation of the imaging device 2B is different from the operation of the imaging device 2 (FIG. 2) described in the first embodiment above in that step S119 is added, and in that steps S110B, S112B to S114B, S117B, and S118B are adopted instead of steps S110, S112 to S114, S117, and S118.

Accordingly, in the following, only the differences mentioned above will be described.

Step S119

When the power of the imaging device 2B is turned on (step S101: Yes), the position acquisition unit 29 acquires position information of the imaging device 2B in step S119. Then, the first control unit 28B stores the position information acquired by the position acquisition unit 29 in the first memory unit 25. Then, the imaging device 2B proceeds to step S102.

Step S110B

The imaging control unit 285B according to the third embodiment reads, in step S110B (recording step), recording planned image data provisionally recorded in the first memory unit 25 in step S108 and the position information recorded in the first memory unit 25 in step S119. Also, the imaging control unit 285B generates an image file in which the position information and determination result information generated in step S109 are associated with the recording planned image data. Then, the imaging control unit 285B records the image file in the image data recording unit 27. Then, the imaging device 2B returns to step S101.

Figure 16A:
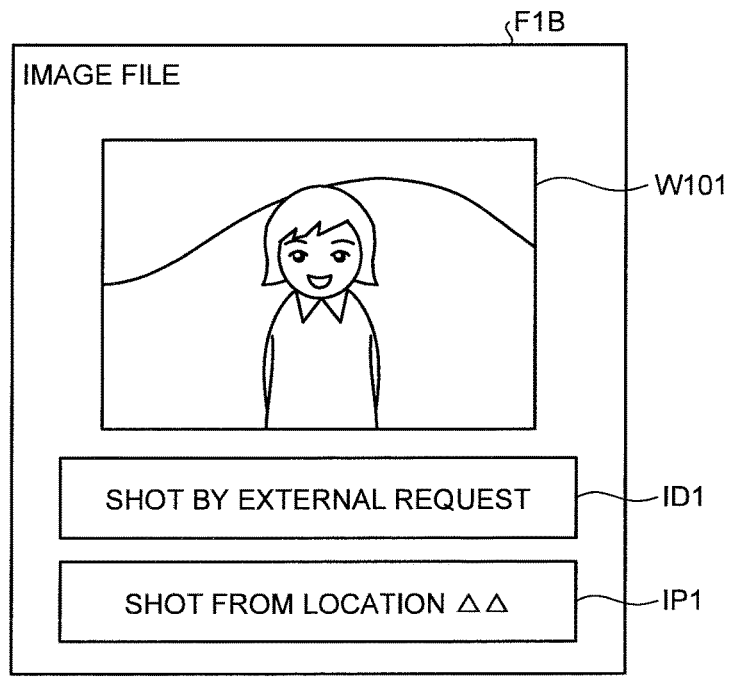
FIG. 16A is a diagram illustrating an example of an image file that is generated by the imaging device illustrated in FIG. 14 according to the automatic shooting instruction illustrated in (d) of FIG. 5.

FIG. 16A is a diagram illustrating an example of an image file F1B that is generated by the imaging device 2B according to the automatic shooting instruction illustrated in (d) of FIG. 5.

Specifically, FIG. 16A is a diagram corresponding to FIGS. 4 to 6, and illustrates an example of an image file F1B that is generated by the imaging device 2B when the automatic shooting instruction illustrated in (d) of FIG. 5 is issued by the user of the communication device 3.

For example, as illustrated in FIG. 16A, when the user of the communication device 3 issues the automatic shooting instruction illustrated in (d) of FIG. 5, the imaging device 2B according to the third embodiment generates the image file F1B that is different from the image file F1 (FIG. 6) described in the first embodiment above (step S110B).

Specifically, the image file F1B is an image file in which, in addition to determination result information ID1 indicating shooting by an external request (shooting according to the automatic shooting instruction), position information IP1 indicating shooting from a location ΔΔ (FIG. 4) is associated with live view image data corresponding to the live view image W101.

Steps S112B to S114B

In step S112B, the user operation recognition unit 283B according to the third embodiment performs, in addition to the determination the same as in step S112 described in the first embodiment above, the determination regarding presence or absence of the user operation described below.

The user operation recognition unit 283B compares the position information of the imaging device 2B which was stored in the first memory unit 25 in step S119 in the past and the latest position information of the imaging device 2B stored in the first memory unit 25 in step S119, and determines whether a user operation for changing the position of the imaging device 2B has been performed.

Then, in the case where it is determined that there has been a user operation (step S112B: Yes), the user operation recognition unit 283B recognizes the content of the user operation (step S113B: user operation recognition step), and stores, in the first memory unit 25, user operation information regarding the user operation (information indicating that the imaging device 2B has been moved to the current position that is based on the position information) (step S114B).

Steps S117B, S118B

In step S117B (determination step), the recording determination unit 284B according to the third embodiment performs, as in step S117 described in the first embodiment above, determination and generation of determination result information, and also, if the operation instruction based on the received operation instruction information is a specific position shooting instruction regarding instruction to perform shooting from a specific position, performs determination and generation of determination result information described below.

The recording determination unit 284B determines, based on a specific position which was specified by the operation instruction information and the user operation information which was stored in the first memory unit 25 in step S114B (information indicating that the imaging device 2B has been moved to the current position that is based on the position information), whether or not recording planned image data is to be recorded according to an operation instruction from outside, and generates determination result information regarding the result of the determination.

Then, in step S118B (recording step), the imaging control unit 285B according to the third embodiment reads the recording planned image data which was provisionally recorded in the first memory unit 25 in step S116, and the position information which was stored in the first memory unit 25 in step S119. Also, the imaging control unit 285B generates an image file in which the position information and the determination result information generated in step S117B are associated with the recording planned image data. Then, the imaging control unit 285B records the image file in the image data recording unit 27. Then, the imaging device 2B returns to step S101.

Figure 16B:
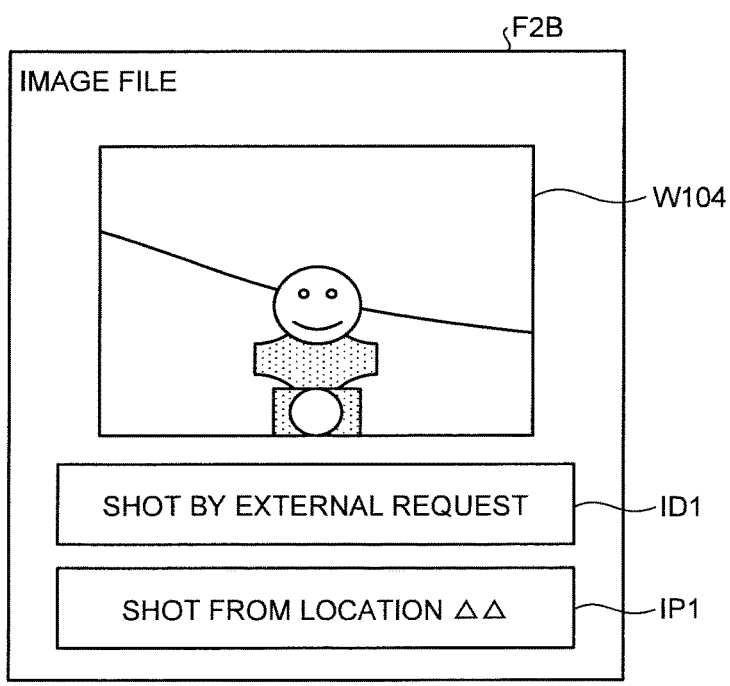
FIG. 16B is a diagram illustrating an example of an image file that is generated by the imaging device illustrated in FIG. 14 according to the shooting reservation instruction illustrated in (f) of FIG. 7.

FIG. 16B is a diagram illustrating an example of an image file F2B that is generated by the imaging device 2B according to the shooting reservation instruction illustrated in (f) of FIG. 7.

Specifically, FIG. 16B is a diagram corresponding to FIGS. 4, 7 and 8, and illustrates an example of an image file F2B that is generated by the imaging device 2B when the shooting reservation instruction illustrated in (f) of FIG. 7 is issued by the user of the communication device 3.

For example, when the user of the communication device 3 issues the shooting reservation instruction illustrated in (f) of FIG. 7, and the user of the imaging device 2B performs an operation according to the shooting reservation instruction, the imaging device 2B according to the third embodiment generates an image file F2B that is different from the image file F2 (FIG. 8) described in the first embodiment above, as illustrated in FIG. 16B (step S118B).

Specifically, the image file F2B is an image file in which, in addition to determination result information ID1 indicating shooting by an external request, position information IP1 indicating shooting from a location ΔΔ (FIG. 4) is associated with live view image data corresponding to the live view image W104.

Additionally, although not specifically illustrated, if the user of the imaging device 2B does not perform an operation according to the shooting reservation instruction illustrated in (f) of FIG. 7 (for example, if the direction of the imaging device 2B is moved to the left, and a shooting operation is performed), the imaging device 2B generates the image file described below.

That is, since the shooting reservation instruction is not followed, the image file is the image file F2B illustrated in FIG. 16B in which the determination result information ID1 is the determination result information indicating shooting by the user of the imaging device 2B.

Figure 16C:
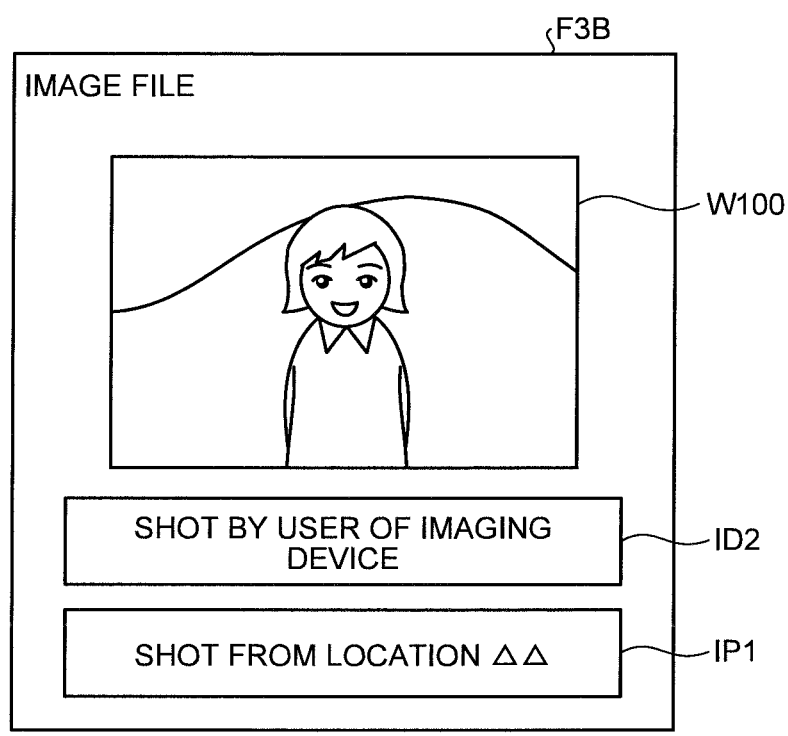
FIG. 16C is a diagram illustrating an example of an image file that is generated by the imaging device when shooting is performed as intended by a user of the imaging device illustrated in FIG. 14 without the automatic shooting instruction illustrated in (d) of FIG. 5 or the shooting reservation instruction illustrated in (f) of FIG. 7 being issued by a user of the communication device.

FIG. 16C is a diagram illustrating an example of an image file F3B that is generated by the imaging device 2B when shooting is performed as intended by the user of the imaging device 2B without the automatic shooting instruction or the shooting reservation instruction being issued by the user of the communication device 3.

Specifically, FIG. 16C is a diagram corresponding to FIGS. 4, 5, 7 and 9, and illustrates an example of an image file F3B that is generated by the imaging device 2B when an shooting operation is performed by the user of the imaging device 2B in a state where the live view image W100 illustrated in (a) of FIG. 5 and (a) of FIG. 7 is displayed by the imaging device 2B and where the automatic shooting instruction illustrated in (d) of FIG. 5 or the shooting reservation instruction illustrated in (f) of FIG. 7 is not issued by the user of the communication device 3.

For example, in the case described above, the imaging device 2B according to the third embodiment generates an image file F3B that is different from the image file F3 (FIG. 9) described in the first embodiment above, as illustrated in FIG. 16C (step S118B).

Specifically, the image file F3B is an image file in which, in addition to the determination result information ID2 indicating shooting by the user of the imaging device 2B, the position information IP1 indicating shooting from the location ΔΔ (FIG. 4) is associated with the live view image data corresponding to the live view image W100.

Specific Examples of Specific Position Shooting Instruction and Image File

Specific examples of the specific position shooting instruction to be issued by the user of the communication device 3 at the time of operation of the imaging system 1B as described above, and the image file to be generated by the imaging device 2B according to the specific position shooting instruction will be described.

Figure 17:
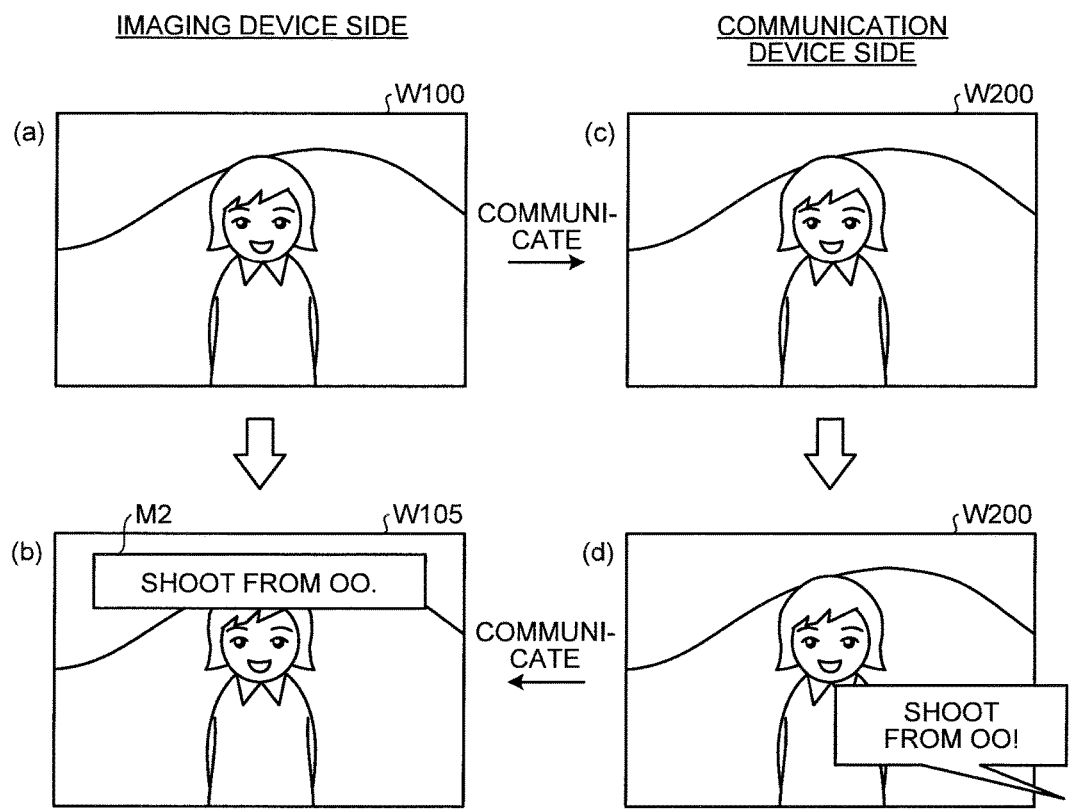
FIG. 17 is a diagram illustrating an example of a specific position shooting instruction (an operation instruction) that is issued by a user of the communication device at the time of operation of the imaging system illustrated in FIG. 15.

FIG. 17 is a diagram illustrating an example of a specific position shooting instruction (an operation instruction) that is issued by the user of the communication device 3 at the time of operation of the imaging system 1B.

Specifically, FIG. 17 is a diagram corresponding to FIGS. 4 and 5, and illustrates examples of images to be displayed by the imaging device 2B ((a) and (b) of FIG. 17), and examples of images to be displayed by the communication device 3 ((c) to (d) of FIG. 17). Additionally, (a) and (c) of FIG. 17 illustrate live view images W100 and W200 the same as those of (a) and (c) of FIG. 5, respectively.

If the user of the communication device 3 wants to cause the user of the imaging device 2B to perform shooting from a specific position (a location ◯◯ different from the location ΔΔ where the user of the imaging device 2B is currently present (FIG. 4)) at the time of checking the live view image W200 ((c) of FIG. 17) that is displayed by the communication device 3, the user of the communication device 3 utters words "shoot from ◯◯" as illustrated in (d) of FIG. 17, for example.

Then, the communication device 3 determines that there is an operation instruction, based on the audio data from the second input unit 32 (audio data corresponding to the audio "shoot from ◯◯") (step S204: Yes). Also, the communication device 3 analyzes the audio data, generates operation instruction information regarding a specific position shooting instruction to perform shooting from ◯◯ (the specific position) (step S205), and transmits the same to the imaging device 2B (step S206).

On the other hand, the imaging device 2B determines, based on the operation instruction information which has been received, that the operation instruction is the specific position shooting instruction (that it is not the automatic shooting instruction) (step S107: No). Then, as illustrated in (b) of FIG. 17, the imaging device 2B superimposes, on the live view image W100 that is currently displayed, an image according to the specific position shooting instruction (a message M2: "shoot from ◯◯"), and displays a superimposed image W105 for a predetermined period of time (step S111).

The user of the imaging device 2B checks the message M2 included in the image W105 ((b) of FIG. 17) displayed on the imaging device 2B, and determines whether or not to perform an operation according to the message M2.

In the following, a case where the user of the imaging device 2B performs an operation according to the message M2 (a case where the user moves to the location ◯◯, and performs the shooting operation on the first input unit 23) will be described.

When the user of the imaging device 2B moves the imaging device 2B from the location ΔΔ (FIG. 4) to the location ◯◯, the imaging device 2B recognizes the user operation (step S113B), and stores user operation information regarding the user operation (information indicating movement of the imaging device 2B to the location ○○) in the first memory unit 25 (step S114B).

Then, in the case where a shooting operation is performed by the user of the imaging device 2B on the first input unit 23 (step S115: Yes), the imaging device 2B provisionally records live view image data corresponding to the live view image that is displayed at the time of performance of the shooting operation (step S116). Also, the imaging device 2B generates, based on the operation instruction information which was stored in the first memory unit 25 in step S105 (the specific position shooting instruction to perform shooting from the location ○○) and the user operation information which was stored in the first memory unit 25 in step S114B (the operation for moving the imaging device 2B to the location ○○, and the shooting operation), determination result information indicating shooting by an external request (step S117B). Then, the imaging device 2B performs generation and recording of an image file (step S118B).

Figure 18:
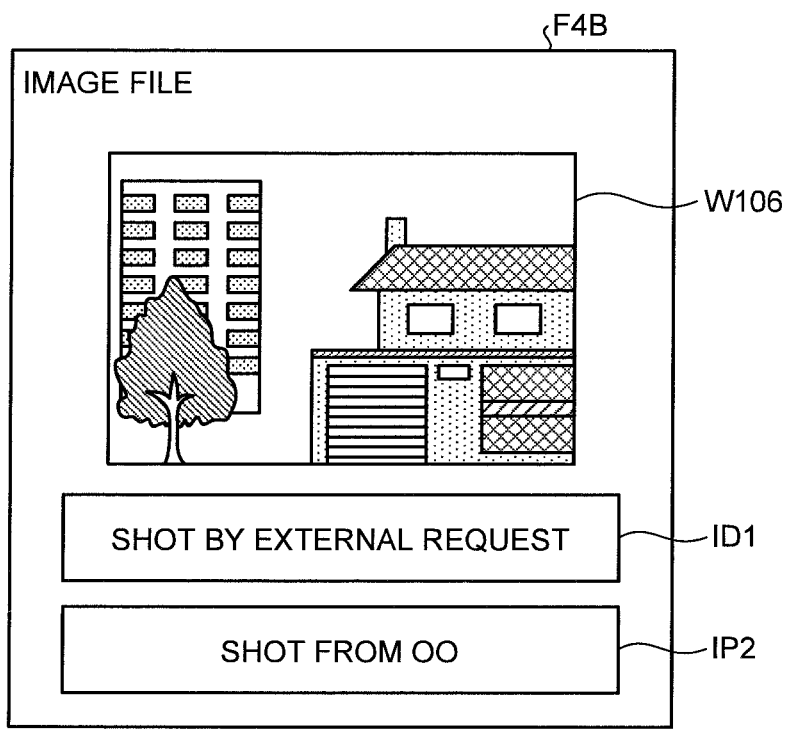
FIG. 18 is a diagram illustrating an example of an image file that is generated by the imaging device illustrated in FIG. 14 according to the specific position shooting instruction illustrated in FIG. 17.

FIG. 18 is a diagram illustrating an example of an image file F4B that is generated by the imaging device 2B according to the specific position shooting instruction illustrated in FIG. 17.

Specifically, as illustrated in FIG. 18, in step S118B, the imaging device 2B generates, and records, an image file F4B in which the determination result information ID1 indicating shooting by an external request and position information IP2 indicating shooting from the location ○○ are associated with live view image data corresponding to a live view image W106 obtained by performing shooting at the location ○○.

According to the third embodiment described above, the following effect may be achieved in addition to the same effect as that of the first embodiment described above.

The imaging device 2B according to the third embodiment includes the position acquisition unit 29 for acquiring position information about the position of the imaging device 2B. Also, the user operation recognition unit 283B recognizes a user operation of moving the imaging device 2B based on the position information acquired by the position acquisition unit 29. Moreover, the recording determination unit 284B determines whether or not recording planned image data is to be recorded according to an operation instruction from outside, based on the operation instruction information received by the first communication unit 24 and the user operation information about the user operation recognized by the user operation recognition unit 283B.

Accordingly, a specific position shooting instruction to perform shooting at a specific position may be issued by the communication device 3 to the user of the imaging device 2B, and also, whether or not a user operation according to the specific position shooting instruction is performed may be recorded in association with the image data.

Thus, also when such a specific position shooting instruction is issued, where the responsibility regarding recording of image data lies may be made clear.

Other Embodiments

Heretofore, modes for carrying out the present invention have been described, but the present invention is not limited to the first to the third embodiments described above.

According to the first to the third embodiments above, the imaging devices 2, 2A, and 2B include the recording determination units 284, 284A, and 284B, respectively, but this is not restrictive, and configurations are possible where the recording determination units 284, 284A, and 284B are omitted. That is, steps S109, S117, S311, S320, and S117B may be omitted from the operations of the imaging devices 2, 2A, and 2B. In this case, at the time of generating an image file (steps S110, S118, S312, S321, S110B, and S118B), the imaging control units 285, 285A, and 285B may each generate an image file in which the recording planned image data is associated with at least one of the operation instruction information stored in step S106 or S307 and the user operation information stored in step S114, S316 or S114B, instead of the determination result information.

For example, if the operation instruction is the automatic shooting instruction, an image file in which only the operation instruction information is associated with the recording planned image data is generated. Also, if the operation instruction is the shooting reservation instruction or the specific position shooting instruction, an image file in which both the operation instruction information and the user operation information are associated with the recording planned image data is generated. Furthermore, if the operation instruction information is not received, an image file in which only the user operation information is associated with the recording planned image data is generated.

Also with the configurations described above, an effect that where the responsibility regarding recording of image data lies may be made clear may be achieved.

That is, in remote camera shooting using the imaging systems 1, 1A, and 1B according to the first to the third embodiments described above, to make clear where the responsibility regarding the copyright or the personality rights arising at the time of shooting, or regarding shooting in a shooting prohibited area, for example, lies is a matter of great importance that must be considered. When giving a good consideration on these matters, there is a possibility that if a person performing remote shooting (the user of the communication device 3) performs shooting without being aware of a shooting prohibited area, or performs shooting ignoring the personality rights, the user of the imaging device 2, 2A, or 2B (the holder or the owner) may be in trouble, but with the present invention, these situations may be appropriately coped with. Also, information about operations such as external shooting prohibition and permission performed by the users of the imaging devices 2, 2A, and 2B on the imaging devices 2, 2A, and 2B may additionally be recorded in association with image data. Moreover, when a plurality of parties are involved in shooting, various conflicting interests may arise, and it is important to record, with respect to records up to the shooting, communication results and the like including audio information. In the end, one or both parties have to accept the responsibility regarding shooting, and thus, a configuration may be adopted where, in a shooting situation where shooting by a user operation by the imaging device 2, 2A, or 2B and shooting by communication with an external communication device 3 are mixed, information indicating the relationship of responsibility acceptance and responsibility abandonment of both the user of the imaging device 2, 2A, or 2B and the user of the communication device 3 is associated with captured image data.

Also, in the first to the third embodiments described above, the imaging devices 2, 2A, and 2B superimpose and display, in steps S111 and S313, an image according to operation instruction information (for example, the message M1 or M2 ((b) of FIG. 7, (b) of FIG. 17) on a live view image, but this is not restrictive. For example, a speaker or the like may be separately provided, and audio according to the operation instruction information may be announced from the speaker.

Moreover, in the first to the third embodiments described above, configurations have been described where an image file in which determination result information and the like are associated with image data generated by still image shooting is generated, but this is not restrictive, and an image file in which determination result information and the like are associated with image data generated by video shooting may alternatively be generated.

Also, the processing flows are not restricted to the orders of processing in the flow charts described in the first to the third embodiments described above, and may be changed as long as no inconsistencies are caused.

Furthermore, in the present specification, the algorithms of the processes described with reference to the flow charts may be written as programs. Such programs may be recorded in a recording unit inside a computer, or may be recorded in a computer-readable recording medium. Recording of a program in a recording unit or a recording medium may be performed at the time of shipping of the computer or the recording medium as goods, or may be performed by downloading via a communication network.

An imaging device according to some embodiments determines, based on at least one of operation instruction information received from an external communication device and a user operation which has been recognized, whether or not image data planned to be recorded in a recording unit is to be recorded in the recording unit according to an operation instruction based on the operation instruction information. Then, the first imaging device records the image data generated by an imaging unit in the recording unit in association with determination result information regarding the determination result.

Also, an imaging device according to some embodiments records image data generated by an imaging unit in a recording unit in association with at least one of operation instruction information received from an external communication device and user operation information regarding a user operation which has been recognized.

Accordingly, a user of the imaging device may recognize, at the time of checking the image data recorded in the recording unit, at least one of determination result information, the operation instruction information and the user operation information which are associated with the image data. That is, the user of the imaging device may determine whether the image data has been recorded according to an operation instruction from an external communication device or according to an operation intended by the user and not according to an operation instruction from an external device.

Accordingly, it is possible to make clear where the responsibility regarding recording of image data lies.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging system comprising:
   a) an imaging device operated by a first user, the imaging device including
      i) an imaging unit that generates image data,
      ii) a first communication unit that receives operation instruction information related to an operation instruction from a communication device operated by a second user,
      iii) a control central processing unit that recognizes a user operation and that records the image data generated by the imaging unit in a recording unit, and
      iv) a first display unit,
         wherein the first communication unit transmits first responsibility acceptance information to the communication device when the control central processing unit recognizes a responsibility acceptance operation indicating that the first user operating the imaging device accepts a responsibility related to recording the image data in the recording unit, and otherwise transmits first responsibility abandonment information to the communication device when the control central processing unit recognizes a responsibility abandonment operation indicating that the first user operating the imaging device abandons the responsibility, and
      the control central processing unit (1) associates the image data with either one of the first responsibility acceptance information and the first responsibility abandonment information and (2) records the image data in the recording unit; and
   b) the communication device that connects to the imaging device to transmit and receive information to and from the imaging device, the communication device including
      i) an instruction input unit that accepts from the second user an operation instruction for the imaging device,
      ii) a second communication unit that transmits operation instruction information related to the operation instruction to the imaging device, and
      (iii) a second display unit,
   wherein
   the first display unit displays an image corresponding to the image data,
   the first communication unit transmits the image data generated by the imaging unit to the communication device,
   the second communication unit receives the image data from the imaging device, and
   the second display unit displays an image corresponding to the image data received by the second communication unit and a message requesting the user of the imaging device to input the operation instruction for the imaging unit.

2. The imaging system according to claim 1, wherein the control central processing unit further associates the image data with the operation instruction information, and records the image data in the recording unit.

3. The imaging system according to claim 1, wherein the control central processing unit further associates the image data with user operation information related to the user operation recognized by the control central processing unit, and records the image data in the recording unit.

4. The imaging system according to claim 1, wherein the control central processing unit further associates the image data with history information in which all pieces of operation instruction information received by the first communication unit from previous recording of the image data in the recording unit to current recording of the image data in the recording unit and all pieces of user operation information related to all user operations recognized by the control central processing unit from the previous recording to the current recording are arranged in chronological order, and records the image data in the recording unit.

5. The imaging system according to claim 1, further comprising a position acquisition unit that acquires position information related to a position of the imaging device, wherein the operation instruction includes a specific position shooting instruction related to an instruction of shooting from a specific position, and the control central processing unit recognizes the user operation indicating movement of the imaging device based on the position information acquired by the position acquisition unit.

6. An imaging method for use in a system including (1) an imaging device operated by a first user and including (i) an imaging unit that generates image data, (ii) a first communication unit, (iii) a control central processing unit that recognizes a user operation and that records the image data generated by the imaging unit in a recording unit, and a (iv) a first display unit, and (2) a communication device operated by a second user and including (i) an instruction input unit, (ii) a second communication unit, and (iii) a second display unit, the imaging method comprising:

a) accepting from the second user, with the instruction input unit, an operation instruction for the imaging device;

b) transmitting, with the second communication unit, operation instruction information related to the operation instruction to the imaging device;

c) receiving, with the first communication unit, operation instruction information which is related to an operation instruction from the communication device;

d) transmitting, with the first communication unit, first responsibility acceptance information to the communication device when the control central processing unit recognizes a responsibility acceptance operation indicating that the first user operating the imaging device accepts a responsibility related to recording the image data in the recording unit, and otherwise transmitting first responsibility abandonment information to the communication device when the control central processing unit recognizes a responsibility abandonment operation indicating that the first user operating the imaging device abandons the responsibility;

e) associating, with the control central processing unit, the image data with either one of the first responsibility acceptance information and the first responsibility abandonment information;

f) recording the image data in the recording unit;

g) displaying, with the first display unit, an image corresponding to the image data;

h) transmitting, with the first communication unit, the image data generated by the imaging unit to the communication device;

i) receiving, with the second communication unit, the image data from the imaging device; and j) displaying, with the second display unit, an image corresponding to the image data received by the second communication unit and a message requesting the user of the imaging device to input the operation instruction for the imaging unit.

7. The imaging method according to claim 6 further comprising:

associating, with the control central processing unit, the image data with the operation instruction information; and recording the image data in the recording unit.

8. The imaging method according to claim 6 further comprising:

associating, with the control central processing unit, the image data with user operation information related to the user operation recognized by the control central processing unit; and recording the image data in the recording unit.

9. The imaging method according to claim 6 further comprising:

associating, with the control central processing unit, the image data with history information in which all pieces of operation instruction information received by the first communication unit from previous recording of the image data in the recording unit to current recording of the image data in the recording unit and all pieces of user operation information related to all user operations recognized by the control central processing unit from the previous recording to the current recording are arranged in chronological order; and recording the image data in the recording unit.

10. The imaging method according to claim 6 further comprising:

acquiring, with a position acquisition unit of the imaging device, position information related to a position of the imaging device, wherein the operation instruction includes a specific position shooting instruction related to an instruction of shooting from a specific position; and recognizing, with the control central processing unit, the user operation indicating movement of the imaging device based on the position information acquired by the position acquisition unit.

11. A non-transitory computer readable recording medium having an executable program recorded thereon, the program instructing at least one processor included in a system including (1) an imaging device operated by a first user and including (i) an imaging unit that generates image data, (ii) a first communication unit, (iii) a control central processing unit that recognizes a user operation and that records the image data generated by the imaging unit in a recording unit, and a (iv) a first display unit, and (2) a communication device operated by a second user and including (i) an instruction input unit, (ii) a second communication unit, and (iii) a second display unit, to execute a method comprising:

a) accepting from the second user, with the instruction input unit, an operation instruction for the imaging device;

b) transmitting, with the second communication unit, operation instruction information related to the operation instruction to the imaging device;

c) receiving, with the first communication unit, operation instruction information which is related to an operation instruction from the communication device;

d) transmitting, with the first communication unit, first responsibility acceptance information to the communication device when the control central processing unit recognizes a responsibility acceptance operation indicating that the first user operating the imaging device accepts a responsibility related to recording the image data in the recording unit, and otherwise transmitting first responsibility abandonment information to the communication device when the control central processing unit recognizes a responsibility abandonment operation indicating that the first user operating the imaging device abandons the responsibility;

e) associating, with the control central processing unit, the image data with either one of the first responsibility acceptance information and the first responsibility abandonment information;

f) recording the image data in the recording unit;

g) displaying, with the first display unit, an image corresponding to the image data;

h) transmitting, with the first communication unit, the image data generated by the imaging unit to the communication device;

i) receiving, with the second communication unit, the image data from the imaging device; and j) displaying, with the second display unit, an image corresponding to the image data received by the second communication unit and a message requesting the user of the imaging device to input the operation instruction for the imaging unit.

12. The non-transitory computer-readable medium according to claim 11, wherein the method further comprises:

associating, with the control central processing unit, the image data with the operation instruction information; and recording the image data in the recording unit.

13. The non-transitory computer-readable medium according to claim 11, wherein the method further comprises:

associating, with the control central processing unit, the image data with user operation information related to the user operation recognized by the control central processing unit; and recording the image data in the recording unit.

14. The non-transitory computer-readable medium according to claim 11, wherein the method further comprises:

associating, with the control central processing unit, the image data with history information in which all pieces of operation instruction information received by the first communication unit from previous recording of the image data in the recording unit to current recording of the image data in the recording unit and all pieces of user operation information related to all user operations recognized by the control central processing unit from the previous recording to the current recording are arranged in chronological order; and recording the image data in the recording unit.

15. The non-transitory computer-readable medium according to claim 11, wherein the method further comprises:

acquiring, with a position acquisition unit of the imaging device, position information related to a position of the imaging device, wherein the operation instruction includes a specific position shooting instruction related to an instruction of shooting from a specific position; and recognizing, with the control central processing unit, the user operation indicating movement of the imaging device based on the position information acquired by the position acquisition unit.

* * * * *